United States Patent
Don et al.

(10) Patent No.: US 8,819,374 B1
(45) Date of Patent: Aug. 26, 2014

(54) TECHNIQUES FOR PERFORMING DATA MIGRATION

(75) Inventors: Arieh Don, Newton, MA (US); Anestis Panidis, Weston, MA (US); Michael J. Scharland, Franklin, MA (US); Patrick Brian Riordan, Newton, MA (US); Ian Wigmore, Westborough, MA (US)

(73) Assignee: EMC Corporation, Hopkinton, MA (US)

(*) Notice: Subject to any disclaimer, the term of this patent is extended or adjusted under 35 U.S.C. 154(b) by 295 days.

(21) Appl. No.: 13/134,728

(22) Filed: Jun. 15, 2011

(51) Int. Cl.
  G06F 13/00 (2006.01)
  G06F 13/28 (2006.01)
  G06F 3/06 (2006.01)

(52) U.S. Cl.
  CPC .......... G06F 3/067 (2013.01); G06F 3/0647 (2013.01); G06F 3/0607 (2013.01); G06F 3/0634 (2013.01); G06F 3/0635 (2013.01); G06F 3/0629 (2013.01)
  USPC ........... 711/165; 711/112; 711/161; 711/162

(58) Field of Classification Search
  USPC ........................................ 711/165
  See application file for complete search history.

(56) References Cited

U.S. PATENT DOCUMENTS

| | | | | |
|---|---|---|---|---|
| 5,623,669 A * | 4/1997 | Kincaid | ................................. | 1/1 |
| 6,067,599 A * | 5/2000 | Kishi et al. | .................... | 711/113 |
| 6,108,748 A * | 8/2000 | Ofek et al. | ..................... | 711/112 |
| 6,145,066 A * | 11/2000 | Atkin | ............................. | 711/165 |
| 6,240,486 B1 * | 5/2001 | Ofek et al. | ..................... | 711/112 |
| 6,356,977 B2 * | 3/2002 | Ofek et al. | ..................... | 711/112 |
| 6,598,134 B2 * | 7/2003 | Ofek et al. | ..................... | 711/162 |
| 7,058,731 B2 * | 6/2006 | Kodama | ............................. | 710/5 |
| 7,080,221 B1 * | 7/2006 | Todd et al. | ..................... | 711/161 |
| 7,085,883 B1 * | 8/2006 | Dalgic et al. | .................. | 711/114 |
| 7,114,012 B2 * | 9/2006 | Morishita et al. | ................ | 710/1 |
| 7,346,664 B2 * | 3/2008 | Wong et al. | ..................... | 709/214 |
| 7,484,059 B1 * | 1/2009 | Ofer et al. | ..................... | 711/162 |
| 7,536,503 B1 * | 5/2009 | Venkatanarayanan et al. | ............................. | 711/112 |
| 7,546,432 B2 * | 6/2009 | Stacey et al. | .................. | 711/165 |
| 7,697,554 B1 * | 4/2010 | Ofer et al. | ..................... | 370/412 |
| 7,707,186 B2 * | 4/2010 | LeCrone et al. | ............... | 707/656 |
| 7,707,381 B2 * | 4/2010 | Kobara | .......................... | 711/170 |
| 7,757,059 B1 * | 7/2010 | Ofer et al. | ..................... | 711/165 |
| 8,028,062 B1 * | 9/2011 | Wigmore et al. | ............. | 709/224 |
| 8,060,710 B1 * | 11/2011 | Don et al. | ..................... | 711/161 |

(Continued)

OTHER PUBLICATIONS

Symmetrix Remote Data Facility Enterprise Storage Software Product Description Guide, EMC Corporation, Jun. 2000 (37 pages).*

*Primary Examiner* — Sanjiv Shah
*Assistant Examiner* — Daniel C Chappell
(74) *Attorney, Agent, or Firm* — Muirhead and Saturnelli, LLC

(57) ABSTRACT

Described are techniques for migrating data from a source device of a source data storage system to a target device of a target data storage system. The target data storage system is configured to operate in accordance with a spoofing mode and a pass-through mode. A first set of commands from the host are processed for the target device when in the pass-through mode and the spoofing mode with respect to the target device. Data is migrated from the source device to the target device. The target data storage system is configured to operate in an echo mode for the target device and processes a second set of commands from the host when in the echo mode for the target device using information stored in the cache from processing the first set of commands.

20 Claims, 13 Drawing Sheets

(56) References Cited

U.S. PATENT DOCUMENTS

| | | | |
|---|---|---|---|
| 8,281,033 B1* | 10/2012 | Riordan et al. | 709/238 |
| 8,301,811 B1* | 10/2012 | Wigmore et al. | 710/74 |
| 8,370,592 B1* | 2/2013 | Specht et al. | 711/162 |
| 8,392,661 B1* | 3/2013 | Metcalf | 711/133 |
| 8,463,860 B1* | 6/2013 | Guruswamy et al. | 709/206 |
| 2002/0004890 A1* | 1/2002 | Ofek et al. | 711/161 |
| 2007/0266056 A1* | 11/2007 | Stacey et al. | 707/203 |
| 2010/0318692 A1* | 12/2010 | Koll et al. | 710/38 |
| 2012/0017042 A1* | 1/2012 | Matsui et al. | 711/114 |
| 2012/0030424 A1* | 2/2012 | Nunez et al. | 711/114 |
| 2012/0131391 A1* | 5/2012 | Musolff | 714/48 |
| 2012/0221790 A1* | 8/2012 | Nunez et al. | 711/114 |
| 2012/0246345 A1* | 9/2012 | Contreras et al. | 710/5 |
| 2012/0278567 A1* | 11/2012 | Broido et al. | 711/162 |
| 2012/0278571 A1* | 11/2012 | Fleming et al. | 711/162 |
| 2012/0278572 A1* | 11/2012 | Broido et al. | 711/162 |
| 2012/0331188 A1* | 12/2012 | Riordan et al. | 710/33 |

* cited by examiner

TECHNIQUES FOR PERFORMING DATA MIGRATION

BACKGROUND

1. Technical Field

This application generally relates to data storage systems, and more particularly to techniques used for migrating data.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices and data storage systems are provided, for example, by EMC Corporation of Hopkinton, Mass. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units, logical devices or logical volumes. The logical disk units may or may not correspond to the actual physical disk drives. Allowing multiple host systems to access the single storage device unit allows the host systems to share data stored therein.

One task that may be performed is migrating data from a source device of a source data storage system to a target device of a target data storage system. In some cases, the source and target storage systems may be characterized as heterogeneous or of different types.

SUMMARY OF THE INVENTION

In accordance with one aspect of the invention is a method of migrating data from a source device of a source data storage system to a target device of a target data storage system. The target data storage system is configured to operate in accordance with a spoofing mode and a pass-through mode for the target device. The spoofing mode causes the target data storage system to represent the target device to a host as the source device of the source data storage system. The source device is accessible to the host on a first path between the host and the source data storage system and the target device is accessible to the host on a second path between the host and the target data storage system. The host identifies the first path and the second path as alternate paths to the source device. A first set of commands is processed from the host. The first set of commands are not user-data commands and are received at the target data storage system for the target device when in the pass-through mode and the spoofing mode with respect to the target device. Processing each of the first set of commands includes forwarding said each command of the first set to the source data storage system for processing and storing said each command of the first set and associated response as determined by the source data storage system in a cache at the target data storage system, and returning the associated response to the host. Data is migrated from the source device to the target device. The target data storage system is configured to operate in an echo mode for the target device after the migration of data from the source device to the target device is completed. A second set of commands from the host is received at the target data storage system when in the echo mode for the target device. The second set of commands are not user-data commands and are directed to the target device represented to the host as the source device. Processing each of the second set of commands includes the target data storage system using information stored in the cache from processing the first set of commands for responding to said each of the second set of commands. The source data storage system may be heterogeneous with respect to the target data storage system. The target data storage system may be in the spoofing mode so that the target device is presented as the source device, the target device is identified to the host as having a same device identifier of the source device and the target data storage system is identified to the host as having a same data storage system identifier as the source data storage system. At least a portion of the first set of commands may be processed during the migration, and the method may further include determining whether said each command of the portion is a user data command to read user data that can be serviced by the target data storage system, and if said each command is a user data command to read user data that cannot be serviced by the target data storage system, forwarding said each command to the source data storage system, returning requested read data from the source data storage system to the target data storage system, storing the requested read data on the target device, and returning the requested read data in a response said each command to the host. At least a portion of the first set of commands may be processed during the migration, and the method may further include: determining whether said each command of the portion is a user data command to write user data, and if said each command is a user data command to write user data, writing the user data to the target device, forwarding said each command to the source data storage system to write the user data to the source device, and returning a response to the host for said each command indicating that the user data is written. When the target data storage system is operating in the echo mode and processing the second set of commands, the source data storage system may be disconnected from the host and target data storage system thereby making, respectively, the source device inaccessible to the host and inaccessible to the target data storage system. When the target data storage system is operating in the echo mode for the target device represented to the host as the source device and processing the second set of commands, the target data storage system may respond to all commands from the host directed to the target device without communicating with the source data storage system. The first data storage system may be a first type of data storage system and the second data storage system may be a second type different from the first type. The first data storage system and the second data storage system may be provided by different data storage system vendors. The method may also include configuring the target data storage system for the target device to a normal mode of operation for processing commands directed to the target device wherein, in response to being configured to operate in the normal mode for the target device, the spoofing mode for the target device is disabled so that the target device is represented to the host as the target device of the target data storage system, the target data storage system is presented to the host as the target data storage system rather than the source data storage system, and the echo mode is disabled. The method may also include: rebooting the host, and performing discovery processing by the host, wherein, as a result of the discovery processing, the target device is presented to the host as the target device from the target data storage system, the target device being identified to the host as having a new device identifier different than the identifier of the source device and the target data storage system being identified to the host as having a new data storage system identifier different than the data storage system identifier of the source data storage system. After performing said discovery processing, subsequent commands from the host received at the target data storage system for the target device may be processed as commands directed to the target device of the target data storage system. The source data storage system may be able to interpret and execute a first vendor-unique command of a first vendor and the target data storage system may be unable to interpret and execute the first vendor-unique command. At a first point in time, the target data storage system may be configured to operate in the pass-through mode for the target device and may perform processing including: receiving a first command from the host that includes a first input that is any of the first vendor-unique command, a command input parameter recognized by the source data storage system but not the target data storage system, and a command opcode recognized by both the source and the target data storage systems wherein an expected response for the command opcode includes at least one data item that varies with data storage system vendor or data storage system type; and recording first information of a response to the first command determined by the source data storage system. At a second point in time subsequent to the first point in time the target data storage system may be configured to operate in the echo mode for the target device, thereby sending responses as if from the source device of the source data storage system. The target system may perform processing including: receiving a second command from the host that includes the first input, and sending a response to the second command from the host including the first information previously recorded. At a third point in time subsequent to the second point in time, the target data storage system may be configured to operate in a normal mode for the target device resulting in disabling the echo mode for the target device and disabling the spoofing mode for the target device so that the target device is represented to the host as the target device of the target data storage system rather than the source device of the source data storage system. Commands directed to the target device when operating in the normal mode for the target device may result in determining appropriate responses in accordance with the target device and target data storage system.

In accordance with another aspect of the invention is a computer readable medium comprising code stored thereon for migrating data from a source device of a source data storage system to a target device of a target data storage system. The computer readable medium comprises code for: configuring the target data storage system to operate in accordance with a spoofing mode and a pass-through mode for the target device, wherein the spoofing mode causes the target data storage system to represent the target device to a host as the source device of the source data storage system, wherein the source device is accessible to the host on a first path between the host and the source data storage system and the target device is accessible to the host on a second path between the host and the target data storage system and wherein the host identifies the first path and the second path as alternate paths to the source device; processing a first set of commands from the host which are not user-data commands and which are received at the target data storage system for the target device when in the pass-through mode and the spoofing mode with respect to the target device, wherein processing each of the first set of commands includes forwarding said each command of the first set to the source data storage system for processing and storing said each command of the first set and associated response as determined by the source data storage system in a cache at the target data storage system, and returning the associated response to the host; migrating data from the source device to the target device; configuring the target data storage system to operate in an echo mode for the target device after the migration of data from the source device to the target device is completed; and processing a second set of commands from the host received at the target data storage system when in the echo mode for the target device, wherein the second set of commands are not user-data commands and are directed to the target device represented to the host as the source device, wherein processing each of the second set of commands includes the target data storage system using information stored in the cache from processing the first set of commands for responding to said each of the second set of commands. The source data storage system may be heterogeneous with respect to the target data storage system. When the target data storage system is in the spoofing mode so that the target device is presented as the source device, the target device may be identified to the host as having a same device identifier of the source device and the target data storage system may be identified to the host as having a same data storage system identifier as the source data storage system. At least a portion of the first set of commands may be processed during the migration, and the computer readable medium may further include code for: determining whether said each command of the portion is a user data command to read user data that can be serviced by the target data storage system; and if said each command is a user data command to read user data that cannot be serviced by the target data storage system, forwarding said each command to the source data storage system, returning requested read data from the source data storage system to the target data storage system, storing the requested read data on the target device, and returning the requested read data in a response said each command to the host. At least a portion of the first set of commands may be processed during the migration, and the computer readable medium may further include code for: determining whether said each command of the portion is a user data command to write user data; and if said each command is a user data command to write user data, writing the user data to the target device, forwarding said each command to the source data storage system to write the user data to the source device, and returning a response to the host for said each command indicating that the user data is written. When the target data storage system is operating in the echo mode and processing the second set of commands, the source data storage system may be disconnected from the host and target data storage system thereby making, respectively, the source device inaccessible to the host and inaccessible to the target data storage system.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
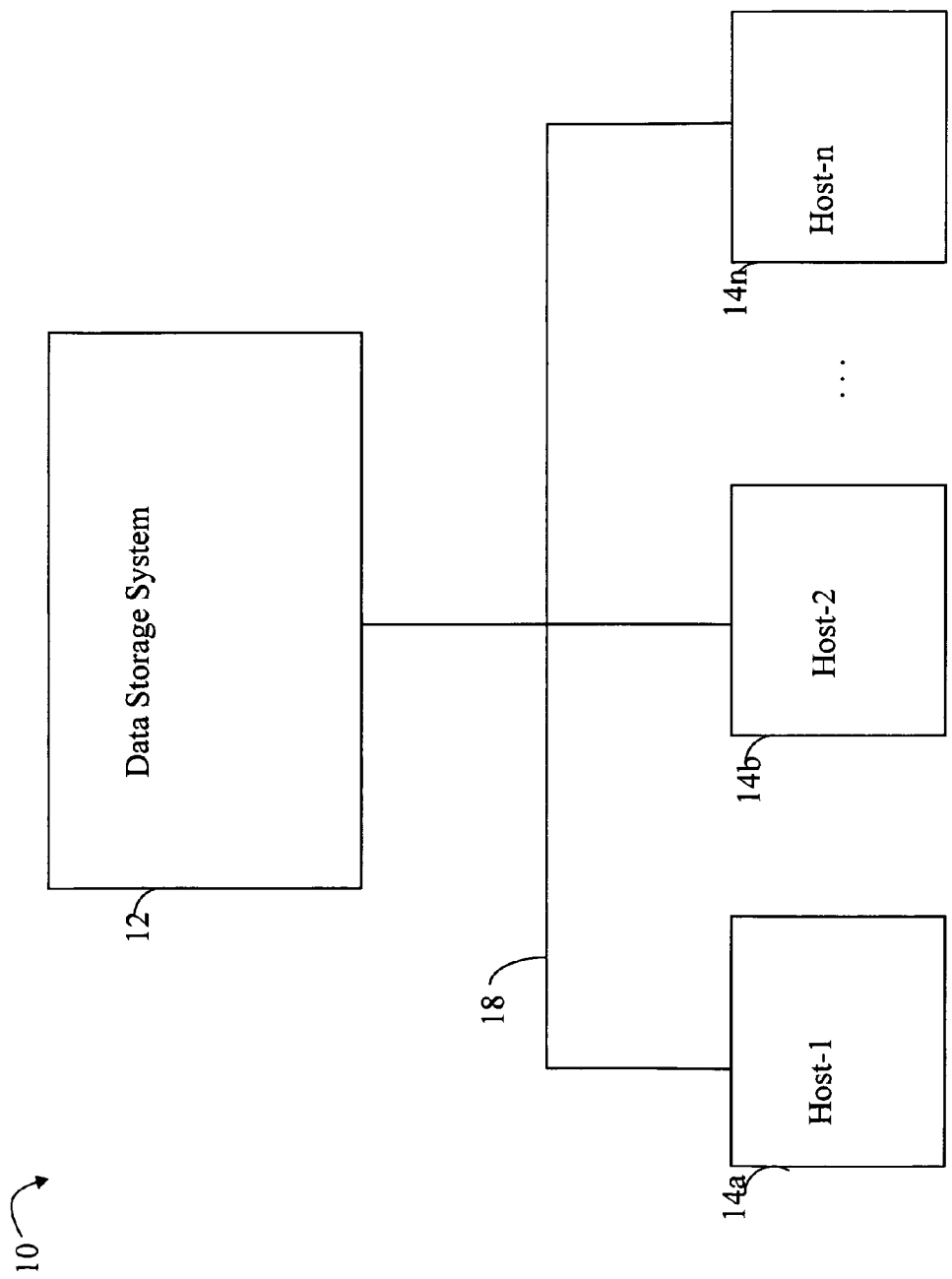
FIG. 1 is an example of an embodiment of a computer system that may utilize the techniques described herein.

Referring to FIG. 1, shown is an example of an embodiment of a system that may be used in performing the techniques described herein. The system 10 includes a data storage system 12, such as a data storage array, connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as TCP/IP, SCSI (Small Computer Systems Interface), Fibre Channel, or iSCSI, Fibre Channel over Ethernet, and the like. Some or all of the connections by which the hosts and data storage system 12 may be connected to the communication medium 18 may pass through other communication devices, such as a Connectrix or other switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, such as a single data storage array as EMC's Symmetrix™ data storage system, as well one or more other data storage systems as may vary with the embodiment.

Figure 2A:
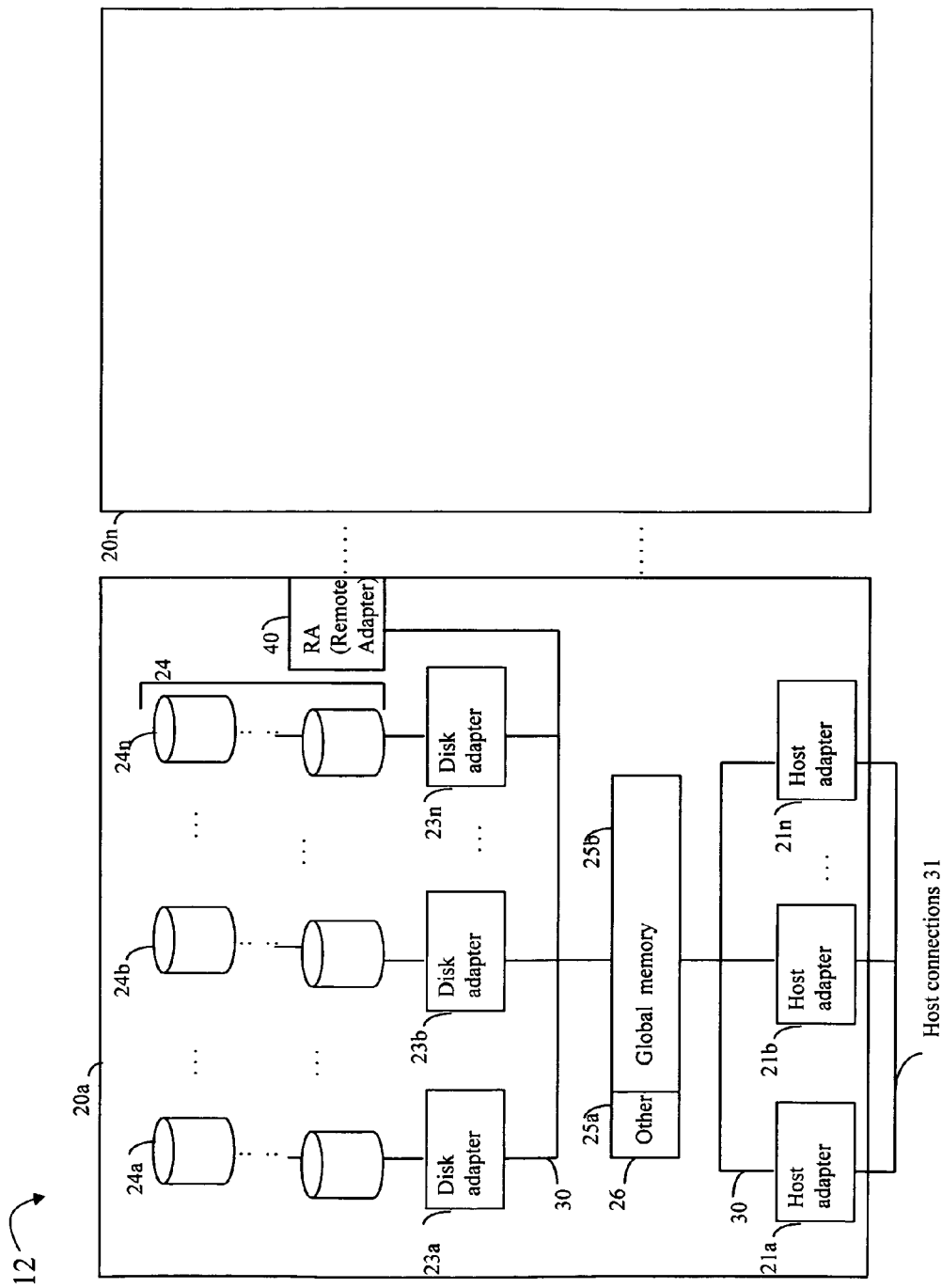
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems. It should be noted that the data storage system 12 may operate stand-alone, or may also included as part of a storage area network (SAN) that includes, for example, other components.

Each of the data storage systems, such as 20a, may include a plurality of disk devices or volumes, such as the arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may perform operations such as reading data from, and writing data to, the physical devices which are serviced by the DA.

The system 20a may also include one or more host adapters ("HAs") or directors 21a-21n. Each of these HAs may be used to manage communications and data operations between one or more host systems and the global memory. In an embodiment, the HA may be a Fibre Channel Adapter (FA) or other adapter which facilitates host communication. Generally, directors may also be characterized as the different adapters, such as HAs (including FAs), DAs RAs and the like, as described herein. Components of the data storage system, such as an HA, which may communicate with a host may also be referred to as front end components. A component of the data storage system which communicates with a front end component may be characterized as a backend component, such as a DA. In connection with data storage systems such as by EMC Corporation, various types of directors or adapters may be implemented as a processor, or, more generally, a component that includes the processor. Examples of directors are disk adapters (DAs), host adapters (HAs) and the like.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA or remote adapter 40. The RA may be hardware including a processor used to facilitate communication between data storage systems, such as between two of the same or different types of data storage systems.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical units also referred to as LUNs (logical unit numbers). The LUNs may or may not correspond to the actual or physical disk drives. For example, one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LUN(s) residing thereon. A LUN or logical unit number may be characterized as a disk array or data storage system reference to an amount of disk space that has been formatted and allocated for use to one or more hosts.

The DA performs I/O operations on a disk drive. Data residing on a LUN may be accessed by the DA following a data request in connection with I/O operations that other directors originate.

Figure 2B:
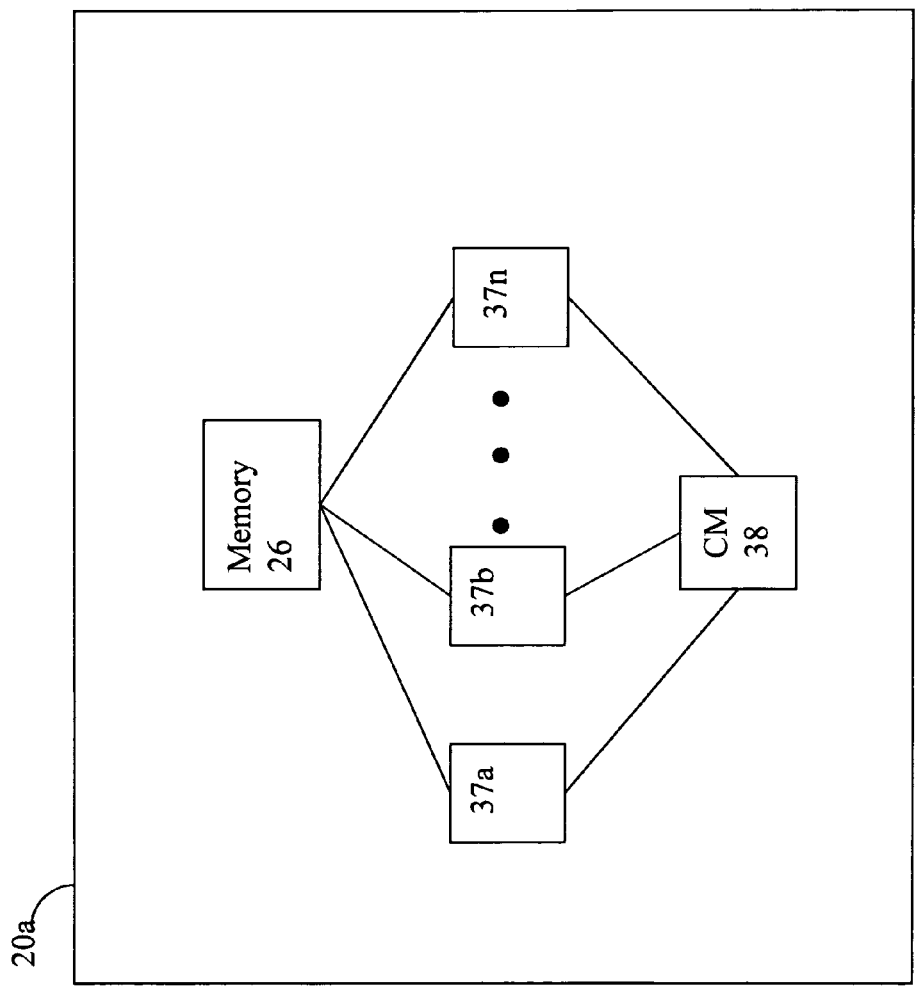
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HAs, RAs, or DAs that may be included in a data storage, system. Each of the directors may be, for example, a processor or a printed circuit board that includes a processor and other hardware components. In an embodiment disclosed herein, there may be up to sixteen directors coupled to the memory 26. Other embodiments may use a higher or lower maximum number of directors that may vary. For example, an embodiment in accordance with techniques herein may support up to 128 directors per data storage system, such as a data storage array. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

A host may be able to access data, such as stored on a LUN of a data storage system, using one or more different physical paths from the host to the data storage system. A host may use a variety of different techniques in connection with selecting one of multiple paths when communicating data operations, such as I/O operations, to the data storage system.

Figure 3:
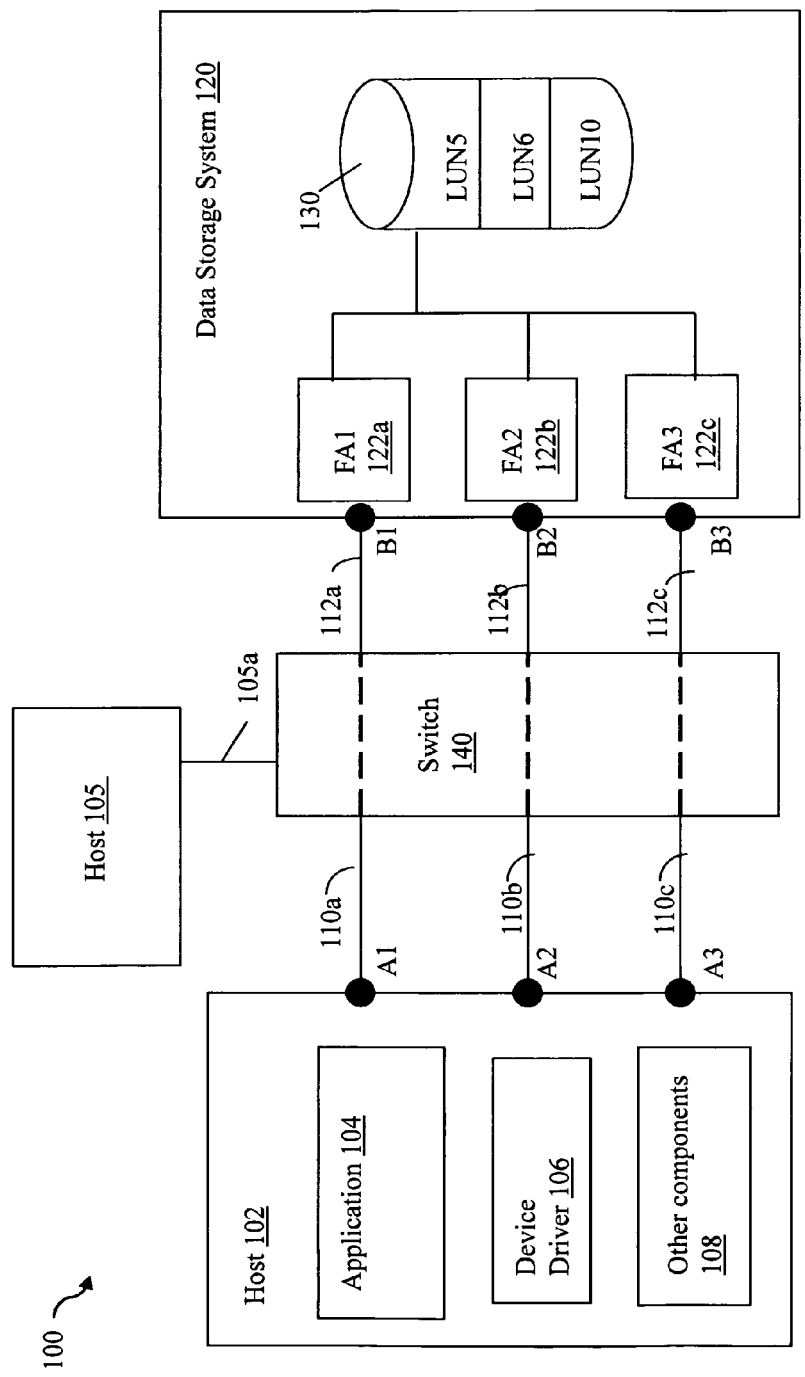
FIG. 3 is an example of a system that may be used in connection with techniques herein and illustrate multipathing.

Referring to FIG. 3, shown is an example of an embodiment of a system that may be utilized in connection with techniques herein. The example 100 includes hosts 102, 105, switch 140 and data storage system 120. The host 102 and data storage system 120 may communicate over one or more paths through the switch 140. Elements 110a-110c denote connections between the host 102 and switch 140. Element 112a-112c denote connections between the data storage system 120 and the switch 140. Element 130 may represent a physical device of the data storage system 120 where the physical device 130 may be configured to include 3 LUNs—LUN5, LUN6 and LUN10. It should be noted that the example 100 includes only 2 hosts, a single data storage system, and a fabric including a single switch for purposes of simplicity to illustrate the techniques herein. In the example 100 and associated description herein, additional details are provided with respect to host 102. It should be noted that host 105 may also include the components and functionality as set forth regarding the host 102. Additionally, although only a single connection 105a is illustrated, element 105a may generally represent one or more paths over which the host 105 may connect to the switch 140 in manner similar to that as described herein for the host 102 such as to communicate with the data storage system 120.

The host 102 may include an application 104, driver 106 and other components 108. An I/O operation from the application 104 may be communicated to the data storage system 120 using the driver 106 and one or more other components represented by element 108. The application 104 may be a database or other application which issues data operations, such as I/O operations, to the data storage system 120. Each of the I/O operations may be directed to a target device, such as one of the LUNs of device 130, configured to be accessible to the host 102 over multiple physical paths. As such, each of the I/O operations may be forwarded from the application 104 to the data storage system 120 over one of the possible multiple paths. The driver 106 may include functionality to perform any one or more different types of processing such as related to encryption, multipathing, mirroring, migration, and the like. For example, the driver 106 may include multipathing functionality for management and use of multiple paths. For example, the driver 106 may perform path selection to select one of the possible multiple paths based on one or more criteria such as load balancing to distribute I/O requests for the target device across available active paths. Load balancing may be performed to provide for better resource utilization and increased performance of the host, data storage system, and network or other connection infrastructure. The driver 106 may be included a commercially available product such as, for example, EMC® PowerPath® software by EMC Corporation. The host 102 may also include other components 108 such as one or more other layers of software used in connection with communicating the I/O operation from the host to the data storage system 120. For example, element 108 may include Fibre Channel or SCSI drivers, a logical volume manager (LVM), and the like. It should be noted that element 108 may include software or other components used when sending an I/O operation from the application 104 where such components include those invoked in the call stack above the driver 106 and also below the driver 106. For example, application 104 may issue an I/O operation which is communicated in a call stack including an LVM, the driver 106, and an FC or SCSI driver.

The data storage system 120 may include one or more physical data storage devices, such as device 130, where each such device is configured into one or more LUNs as described above. Each of the LUNs of the device 130 may be configured to be accessible to the host through multiple paths. For example, all LUNs of 130 may be accessible using ports of the three front end directors or interfaces 122a-122c, also denoted respectively FA1, FA2 and FA3. The multiple paths allow the application I/Os to be routed over multiple paths and, more generally, allow the LUNs of device 130 to be accessed over multiple paths. In the event that there is a component failure in one of the multiple paths, application I/Os can be easily routed over other alternate paths unaffected by the component failure. Thus, an embodiment of the driver 106 may also perform other processing in addition to load balancing in connection with path selection. The driver 106 may be aware of, and may monitor, all paths between the host and the LUNs of the device 130 in order to determine which of the multiple paths are active or available at a point in time, which of the multiple paths are unavailable for communications, and to use such information to select a path for host-data storage system communications.

In the example 100, each of the LUNs of the device 130 may be configured as accessible through three paths. Each path may be represented by two path endpoints—a first endpoint on the host 102 and a second endpoint on the data storage system 120. The first endpoint may correspond to a port of a host component, such as a director on the host 102, and the second endpoint may correspond to a port of a data storage system component, such as a port of an FA of the data storage system 120. In the example 100, elements A1, A2 and A3 each denote a port of a host 102 (e.g. such as a port of a host bus adapter or HBA), and elements B1, B2 and B3 each denote a port of an FA of the data storage system 120. Each of the LUNs of the device 130 may be accessible over three paths—a first path represented by A1-B1, a second path represented by A2-B2 and a third path represented by A3-B3.

Figure 4:
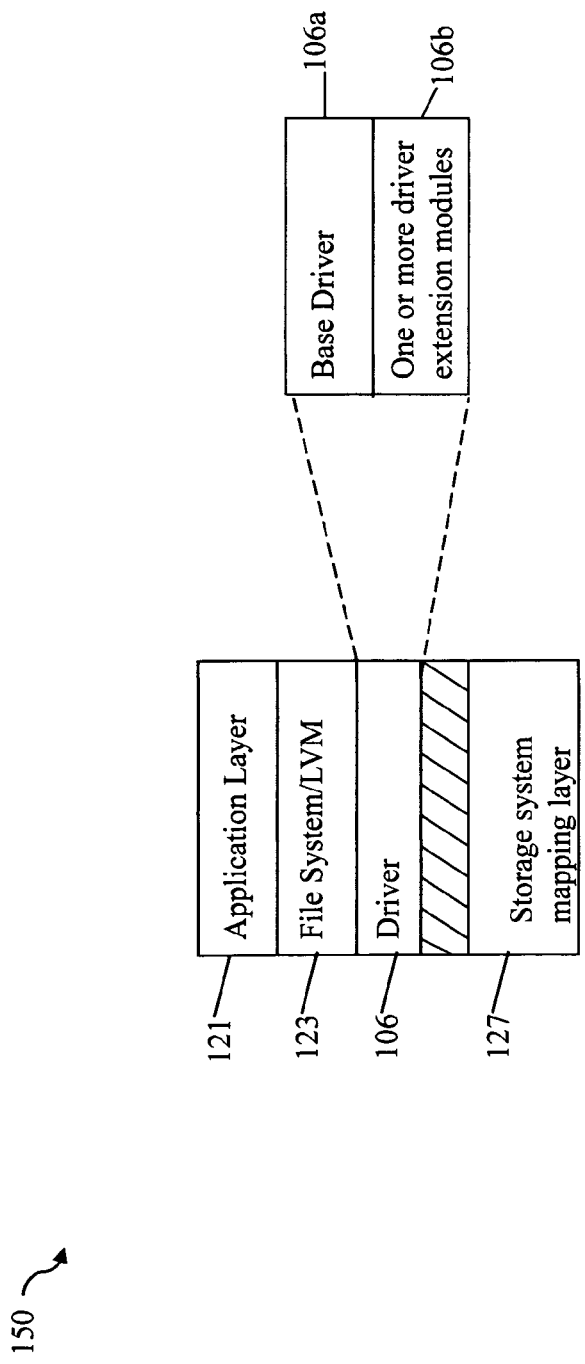
FIG. 4 is an example of software that may be included on a host and storage system in an embodiment in accordance with techniques herein.

Referring to FIG. 4, shown is a representation 150 of a number of mapping layers that may be included in a computer system, such as host 102 of FIG. 3, in combination with a data storage system. FIG. 4 provides further detail regarding various software layers that may be used in connection with the driver 106 of FIG. 3. The system includes an application layer 121 which includes application programs executing on the host computer 102. The application layer 121 may refer to storage locations using an associated label or identifier such as a file name. Below the application layer 121 is the file system/LVM layer 123 that maps the label or identifier specified by the application layer 121 to a LUN which the host may perceive as corresponding to a physical device address (e.g., the address of one of the disk drives) within the storage system 12. Below the file system/LVM layer 123 is the driver 106 which handles processing of the I/O received from layer 123. The driver 106 may include a base driver 106a and one or more driver extension modules 106b. The driver 106 may be included in a commercially available product such as EMC® PowerPath® software. Functionality for performing multipathing operations such as may be performed by EMC® PowerPath® software may be included in one of the extension modules 106b such as a multipath (MP) extension module. As described above, the MP extension module may perform processing in connection with multiple path management and selecting one of a plurality of possible paths for use in connection with processing I/O operations and communicating with the data storage system, such as 120 of FIG. 3. The layer 123 may provide for mapping a LUN as presented by the data storage system to the host to another logical data storage entity that may be used by the application layer 123.

In some embodiments, the data storage system 120 may be an intelligent data storage system having its own mapping layer 127 such that the LUN passed from the host may not directly correspond to a physical device such as a disk drive. In such embodiments, the LUN provided by the host in connection with the I/O operation may be further mapped by the data storage system using its mapping layer 127. For example, a LUN provided by the host may be mapped by the data storage system to one or more physical drives, multiple LUNs may be located on a same physical device, and the like. In other embodiments, the data storage system may not include such a mapping layer 127.

The driver 106, as well as other components illustrated in FIG. 4, may execute in kernel mode or other privileged execution mode. In one embodiment using a Unix-based operating system, the driver 106 may executed in kernel mode. In contrast, an application may typically execute in user mode, or more generally, a non-privileged execution mode. Furthermore, it will be appreciated by those skilled in the art that the techniques herein may be used in an embodiment having any one of a variety of different suitable operating systems including a Unix-based operating system as mentioned above, any one of the Microsoft Windows® operating systems, and the like.

In operation, an application executing at application layer 121 may issue one or more I/O operations (e.g., read and write operations) to devices, such as LUNs of the data storage system. Such I/O operations may be directed to the driver 106 after passing through any intervening layers such as layer 123.

A host may be able to access data, such as stored on a LUN of a data storage system, using one or more different paths from the host to the data storage system such as described above. In connection with an embodiment in accordance with techniques herein, communications between an initiator port of the host (e.g., such as a port of a host's HBA (host bus adapter)) and a target port of a data storage system may include those related to I/O operations and others related to host control and management commands or operations. I/O operations may include, for example, read and write operations. Host control and management operations may include those commands which are not performing I/O with respect to a data storage device (e.g. such as to read or write user data stored on the LUN) and may include SCSI commands such as, for example, inquiry, mode sense, and read capacity. A path used by a host to communicate with a data storage system for commands directed to a LUN may be active indicating that the path may be used for both I/O operations for the LUN and also for control and management operations for the LUN. Thus, when a path is in the active state with respect to a particular LUN, the path may be used to perform host read/write I/O operations or more generally user data commands (e.g., SCSI read or write operations to access host data) as well as host control and management operations, or more generally non-user data commands (e.g., respond to inquiry and mode sense SCSI commands from the hosts).

Prior to discussing the techniques herein that may be used in connection with migrating data from a source device of a source data storage system to a target device of a target data storage system, where the source and target systems may be characterized as heterogeneous (described in more detail elsewhere herein), following paragraphs will first provide a general discussion of some additional elements that may used in connection with such techniques.

In connection with the SCSI protocol and standard, a path may be defined between two ports as described above. A command may be sent from the host (as well as a component thereof such as a host bus adapter) and may be characterized as an initiator, originator or source with respect to the foregoing path. The host, as the initiator, sends requests to a data storage system (as well as a particular component thereof such as another FA having a port with a network address) characterized as a target, destination, receiver, or responder. Each physical connection of a path may be between a first endpoint which is a port of the host (e.g., such as of a host bus adapter) and a second endpoint which is a port of an FA in the data storage system.

Initially, a data storage system may be configured for use by one or more hosts. Part of this configuration processing includes defining what LUNs of the data storage system are accessible or visible to the host over which one or more paths. Discovery processing may then be performed by the host to discover all LUNs accessible to the host and over what one or more paths. As part of discovery processing, the host may issue commands to the data storage system to discover what LUNs are visible to the host over what one or more paths, discover information about each LUN, and the like. For example, the host may issue a first command from a host initiator port (e.g., Report LUNs) to obtain a list of all LUNs visible from the host initiator port. Subsequently, the host may also send a sequence of one or more commands to each LUN from the host initiator port to gather additional information about the LUN and path, perform a path test to determine whether a LUN is currently accessible to the host over the path such as for I/O operations, and the like.

As a result of discovery processing, configuration processing, and the like, the host may obtain information about components in the system that may be used to identify the components as well as uniquely distinguish between available multiple paths to a device. Each data storage system, such as system 120, has a data storage system identifier (e.g. such as a numeric, alphanumeric or other type of identifier). Each FA port of the system 120 has an associated FA identifier. Additionally, each device, such as each LUN of the system 120, has an associated device identifier.

In connection with multiple paths as may be managed and used by the MP driver module described above, techniques may be performed to allow the MP module to determine whether two paths are providing accessibility to the same or different LUNs. For example, a host may use the SCSI standard inquiry page 0 command for this purpose. One of the items returned in response to such a command is information that may be used as a device identifier associated with a particular LUN for which the command was issued. The foregoing device identifier associated with the LUN may be used to uniquely identify the LUN. It should be noted that the level of uniqueness is with respect to all LUNs that may be used by the host across multiple data storage systems, such as multiple data storage arrays and other systems. Therefore, consider the example where the host issues a SCSI standard inquiry page 0 command over path 1 to a LUN and receives in the return payload a first device identifier. The host then issues a second standard inquiry page 0 command over path 2 to a LUN and receives in the return payload a second device identifier. If both the first and second device identifiers are the same, then from the host's perspective, both path 1 and path 2 are accessing the same LUN (e.g., providing access to the LUN over different paths).

In one embodiment, each logical path from an initiator port to a target port may be distinguished from other logical paths using a combination of data storage system identifier and FA port identifier for a port of the storage system, where FA port identifiers may be unique collectively across all FA ports of all data storage systems. Thus, for two paths to a same LUN of the system 120 from a same initiator port of a host where each path uses a different FA port of the storage system, the host (e.g. such as software on the host that perform multipathing) may distinguish between the two paths based on a unique FA port identifier of the storage system associated with each of the two paths. Multipathing functionality as may be embodied in the driver described above may determine multiple paths to the same LUN using the information returned in response to one or more commands issued to the data storage system including the LUN. An embodiment may insulate an application from the fact that multiple paths may be in use by presenting the application with a single device. The driver may then select a path for use with an I/O as described above should that device be accessible on multiple paths. Subsequently, as the number of paths and the availability of the paths may change over time, the application may also be unaware of such changes so long as at least a single path is available to the device. The foregoing functionality that may be utilized in a multipath environment, in combination with other processing, will be described below in connection with facilitating a seamless migration of data from a source device to a target device. The migration may appear seamless to the host issuing commands to the source device during the time it is being migrated to the target device since the host has continuous online access to the source device and its data and is able to perform UO operations and other commands directed to the source device. This, and other benefits and features will be apparent to those of ordinary skill in the art.

Data storage systems may operate in a heterogeneous storage environment or a homogeneous storage environment. Two data storage systems may be characterized as homogeneous with respect to one another if the two systems are of a same type (e.g., such as by a same storage vendor), are able to understand (e.g., interpret, recognize) and process, or more generally service, the same set of commands and associated command input parameters, and, in response to such commands, the two systems are able to generate appropriately similar response information for the particular type of data storage system. It should be noted that the response information for a command may also vary among types of data storage systems that are heterogeneous having varying system types depending on the particular information returned in the response information. If two data storage systems are not homogeneous with respect to one another, the two systems may be characterized as heterogeneous with respect to one another. Two data storage systems which are of different types, such as by two different vendors, may be heterogeneous. The foregoing are described in more detail below.

In one aspect as noted above, data storage systems may be characterized as homogeneous in terms of data storage system type if such data storage systems are a same type of data storage system, such as a same data storage system array, from the same data storage vendor. Such homogeneous data storage systems are able to recognize and process a same set of commands and command inputs (e.g., including command opcodes and command input parameters as may vary with vendor and/or product) and respond appropriately to such commands and command inputs for the particular vendor and product including returning any vendor-specific or customized information as may vary with vendor and type of data storage system.

Data storage systems which are homogeneous are able to recognize, understand and appropriately process any vendor-unique or vendor-specific information such as, for example, a same set of command opcodes including any vendor-specific opcodes, and vendor-unique parameters such as may be included in a command descriptor block. Appropriately responding may also include returning the correct and appropriate information in response to a command where such returned information may be customized and vary with data storage system vendor.

A standard such as the SCSI standard may include commands characterized as including vendor-unique or vendor-specific information, such as, for example, commands which include any of a vendor-unique opcode, vendor-unique parameters, and the like. For example, vendor-unique commands may have opcodes which are only understood or recognized by a particular vendor, and/or for a particular type of data storage system by the vendor. Additionally, commands of the SCSI standard which, although may include a same opcode in the command descriptor block that is properly recognized by multiple storage vendors, may include vendor-unique command parameters or vendor-unique input parameters. Still further, commands of the SCSI standard may result in returning information in response to commands where the returned information varies with the particular data storage vendor. That is, although the command may be recognized across heterogeneous data storage systems, the returned information from any such systems may include information characterized as vendor-specific or customized for the particular vendor and/or data storage type of the vendor. Thus, two systems which are homogeneous (in that they are from a same vendor and are a same product or type of storage system) are both expected to return similarly appropriate information customized for the data storage system vendor and data storage system type or product. In contrast, two data storage system which are heterogeneous (e.g., each of which may be a different data storage system type from a particular vendor) are each expected to return information that appropriately varies with the particular type and vendor. For example, a SCSI Inquiry command is a mandatory command of the SCSI standard and thus all data storage system vendors in compliance with the SCSI standard recognize and understand the SCSI Inquiry command opcode. The Inquiry command obtains basic information about a target device such that the returned information includes information that is vendor-specific and varies with the data storage system vendor and other information particular to the type of the underlying or native data storage system. For example, the SCSI inquiry command returns information including a vendor identification data item that varies with vendor, and returns vendor-specific information including vendor-specific parameters so that the particular value has a meaning that varies with vendor. As such, data storage systems considered to be homogeneous from a same vendor are each expected to identify the same vendor and return any appropriate vendor specific information. Additionally, data storage systems considered to be heterogeneous, such as each being from a different vendor, are each expected to identify their respective but differing vendor. As another example, a second command may also be a mandatory command of the SCSI standard and thus all data storage system vendors in compliance with the SCSI standard recognize and understand a second opcode for the second command. The command descriptor block for the second command may also include one or more command-specific input parameters which are also vendor-unique or otherwise may vary with data storage system vendor. Homogenous data storage systems from a particular vendor understand and process the second command and also those command input parameters which are vendor-unique for the particular vendor.

In accordance with one aspect, homogeneous data storage systems may be able to appropriately respond to a same set of commands where such commands may include vendor unique or vendor specific information (e.g., opcodes, command parameters and the like, included in the command input where such, command information varies with vendor) and wherein appropriate responses may include returned information that varies with data storage system vendor, is customized for the particular vendor, and the like. The foregoing commands may be in accordance with a standard, such as a SCSI standard. In contrast to homogeneous data storage systems are heterogeneous data storage systems that are from different vendors and are different data storage system types. Each of the different heterogeneous data storage system types may appropriately respond to a different set of commands and command inputs and return information to such commands as may vary with data storage system type and vendor. As one example, a first data storage system of a first type by a first vendor may utilize a first set of commands and a second data storage system having a second type different from the first type by a second vendor different from the second vendor may utilize a second set of commands. The first set of commands may include vendor-unique, vendor-specific, or more generally, information that may vary with, or otherwise be customized for, the first vendor such as vendor-unique opcodes only recognized by the first vendor, command parameters that are only recognized by the first vendor, and the like. In a similar manner, the second set of commands may include vendor-unique, vendor-specific, or more generally, information that may vary with, or otherwise be customized for, the second vendor such as vendor-unique opcodes only recognized by the second vendor, command parameters that are only recognized by the second vendor, and the like. Two data storage systems that are heterogeneous may also return information in response to a same command where the return information generally varies with, or differs with, data storage type and/or vendor (e.g., return information may include information customized for the vendor or which is specific to each vendor and/or vendor's product such as an identifier, vendor-specific return parameters having underlying meaning or interpretation that varies with vendor, and the like).

It should be noted that a same vendor may also provide different types of data storage systems which are considered heterogeneous. For example, EMC Corporation is a storage vendor that provides data storage systems of different types or which may be considered heterogeneous, such as the Symmetrix® data storage system provided by EMC Corporation may be considered heterogeneous with respect to the CLARiiON® data storage system also provided by the same vendor, EMC Corporation. In connection with two heterogeneous data storage systems, there are commands which may be understood by a first of such two data storage system which may not be understood by the second of such data storage systems (e.g., such as due to differences in the command opcodes and/or command parameters able to be processed on each), and vice versa. Additionally, in connection with two heterogeneous data storage systems, returned information from a first system and a second system in response to a same command (having the same command opcode and the same or different command parameters) may include return information that varies with the data storage system vendor and/or data storage system type (e.g., is customized for the vendor in terms of content and/or layout structure).

Commands of the SCSI standard may be generally categorized as comprising user-data commands and non-user data commands. User data commands may include those commands which operate upon or utilize user data such as read and write commands that, respectively, read user data from and write user data to, a device of the data storage system. If a command is not a user-data command, the command may be referred to as a non-user data command which does not operate upon or utilize user data such as read and write commands to read and write user data to a device of the data storage system. Non-user data commands may include control and management commands as described above which utilize control and management data such as, for example, to control the device, specify or obtain device metadata, and the like. Examples of non-user data SCSI commands include, for example, test unit ready, request sense, inquiry, mode sense, mode select, and the like. It is the non-user data commands, such as the control and management commands, and/or returned information from such commands that may typically differ among heterogeneous data storage systems. Two data storage systems that are considered heterogeneous, for example, may not recognize a same set of non-user data command opcodes (so that one system recognizes a vendor-unique opcode not recognized by the other system), may not use a same set of non-user data command input parameters (so that one system recognizes or uses a vendor-unique input or command parameter not recognized and/or used by the other system), and/or may return different information in response to a same non-user data command having a same opcode (return information may include information that varies with or is specific to each vendor and/or data storage system type). For example, the SCSI inquiry command may be characterized as a non-user data command that is a control and management command. Two data storage systems which are heterogeneous return information in response to such a command having the same Inquiry command opcode but, for such two heterogeneous systems, the return information from each in response to the command includes information that varies with the data storage vendor.

In heterogeneous data storage system environments, data may be migrated between data storage systems of different data storage system types. For example, one embodiment in accordance with techniques herein may be used in connection with migrating data in a heterogeneous data storage system environment from a first or source data storage system to a second or target data storage system, where the source and target data storage systems are of different data storage system types and each able to respond appropriately to a different set of commands than the other system. Heterogeneous data storage systems may not be able to process or recognize the same set of command opcodes, the same command parameters, and/or otherwise may return different information in response to a same command (including the same opcode with the same or different command parameters).

What will now be described are techniques that may be used in connection with performing data migration from a source device of a source data storage system to a target device of a target data storage system where the source and target data storage systems are characterized as heterogeneous being of different types of system. For example, the source and target systems may each be a different storage system type from a different storage vendor. Such techniques for data migration may be performed in a multipath environment where a host or other initiator accessing data of the source device has multiple paths over which to access the source device and, more generally, send commands thereto.

Figure 5:
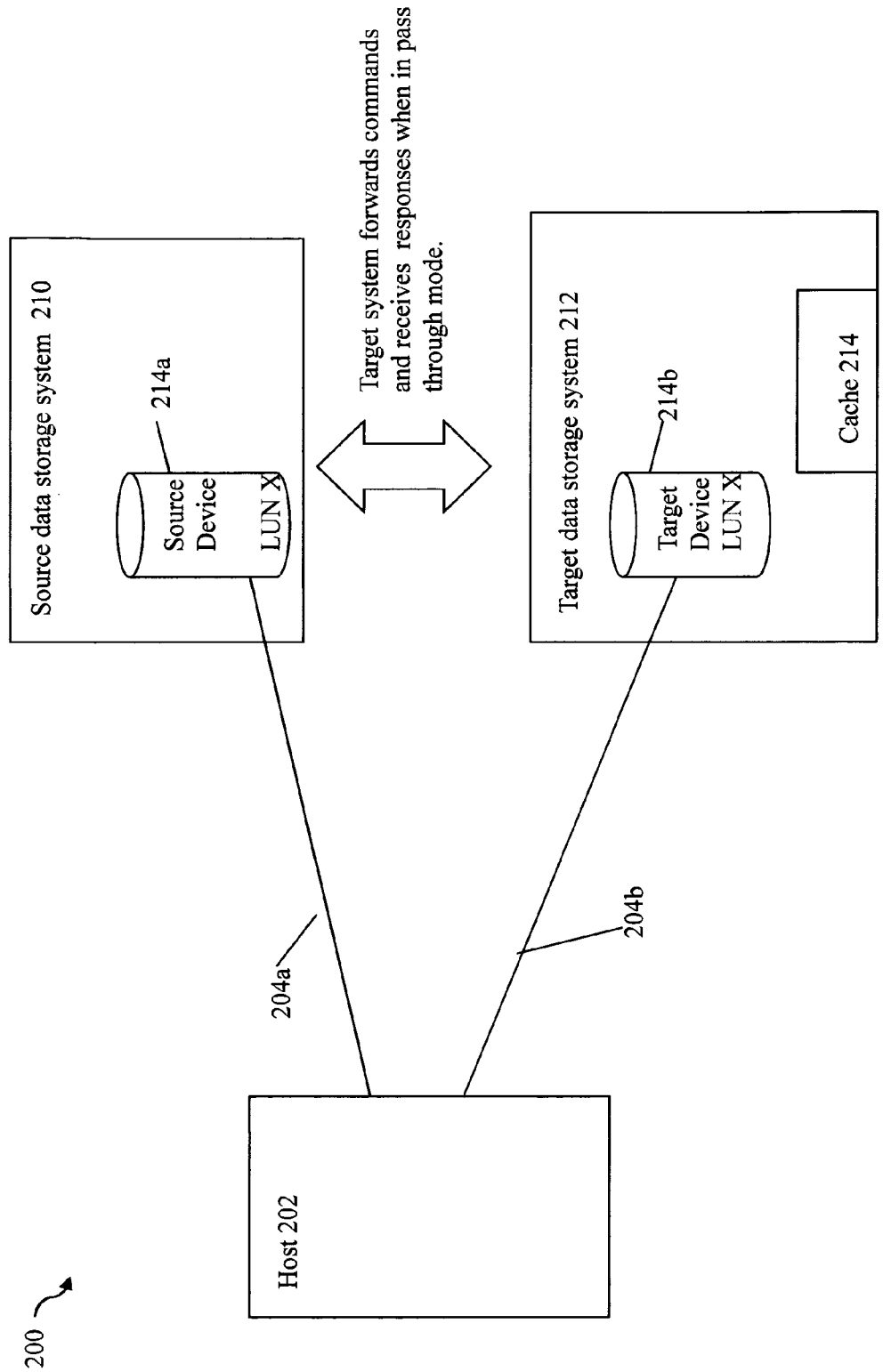
FIGS. 5-7 are examples illustrating processing that may be performed in an embodiment in accordance with techniques herein for data migration.

Referring to FIG. 5, shown is an example of components that may be included in an embodiment of a system in accordance with techniques herein. The example 200 includes a host 202, source data storage system 210, target data storage system 212, storage devices 214a, 214b, a path 204a from host 202 to the source data storage system 210 and a path 204b from the host 202 to the target data storage system 212. The system 210 may be the source data storage system and the system 212 may be the target data storage system with respect to the migration processing to be performed. The device 214a may be the source device having data to be migrated to the device 214b, the target device. Details of the foregoing components of the example 200 have been omitted for simplicity but may be as described elsewhere herein. For example, there may be multiple paths between host 202 and each data storage system 210, 212 although only a single path between the host and each data storage system is illustrated for purposes of simplicity in describing the use of techniques herein. System 210 may be a first type of storage system from a first storage vendor and system 212 may be a second different type of storage system from a second different storage vendor so that systems 210, 212 are heterogeneous.

As described below, the migration techniques provide for migration of data from the source device 214a to target device 214b in a seamless manner from the view or perspective of the host operating in a multipath environment in that the host has continuous ability to access data of the source device and issue commands thereto throughout the migration process. The techniques described below include having the target data storage system and target device spoof or impersonate, respectively, the source data storage system and source device from the host's perspective. The foregoing is facilitated through steps including performing configuration processing to facilitate presentation of the target device and target storage system as, respectively, the source device and source storage system (e.g., spoofing), command redirection from the target to the source system for a time period while operating in pass through mode, migrating the data from the source to the target device during this time period, monitoring and recording non-user data commands and associated responses during this time period, and caching the foregoing commands and associated responses on the target system. Once the migration has completed, the source data storage system may be disconnected from the target system. The target system may continue to operate in accordance with the spoofing mode by continuing to present and identify the target system as the source system and the target device as the source device to the host thereby causing the host to believe it is issuing commands to the source device. The target system may service I/O commands, or more generally, user data commands directed to the source device (and thus the target device presented as the source device) using the migrated data of the target device. The target system may service non-user data commands directed to the source device (and thus the target device presented as the source device) using the cached command and response data previously recorded during the time period. At a later point in time, the target data storage system and target device may be reconfigured to stop spoofing or impersonating the source system and source device. Subsequent to this reconfiguration, the target system and target device are identified or presented to external hosts as based on their true or actual identities as, respectively, the target system and target device. As such, when a host is rebooted or otherwise performs discovery processing, the information returned in response to command inquiries for device and system information identify the target system and target device rather than information identifying the source system and source device. It should be noted that some of the information about the source device and target device may be the same (e.g., may identify the same LUN) or different depending on the command to which the target system is responding.

With reference to FIG. 5 as part of configuration processing prior to performing the actual data migration, the source device 214a and the target device 214b are each configured to have the same device identifier. That is, the target device 214b is configured to have the same device identifier as the source device 214a of the source system 210. It should be noted that the device identifier is a different identifier than the LUN identifier. Rather the device identifier is one that typically varies with each LUN instance. In other words, two LUNs may have the same LUN identifier but such two LUNs each have different and unique device identifiers. The source data storage system 210 and the target data storage system 212 are also each configured to have the same data storage system identifier. That is, the target data storage system 212 is configured to have the same data storage system identifier as the source data storage system 210. More generally, as described elsewhere herein in more detail, the system 212 is configured to present itself to the host as the system 210 (e.g., system 212 responds to any host request for information as if the system 210). However, as noted above, the target FA port of path 204a of the system 210 has a different port identifier than the target FA port of path 204b of the system 212. Thus, the host 202 is able to distinguish the two paths 204a, 204b for the source device 214a. As also described above, since both devices 214a, 214b have a same device identifier and are each included in data storage systems having a same data storage system identifier, the host interprets paths 204a, 204b as two different paths to the same device, LUN X (source device 214a) of the source system 210, when both paths are active. The host 202 recognizes both paths 204a, 204b and may access the source device 214a using any of the paths 204a, 204b. Thus, the host 202 may issue commands (both user data commands and non-user data commands) to source device 214a on either of paths 204a, 204b and, from the host's view, the host is issuing the commands to the same device.

In this example, the host 202 believes that it is issuing commands to the source device 214a device included in the source data storage system when such commands are issued over either of paths 204a or 204b. The foregoing configuration process to configure the device 214b to have the same device identifier as device 214a and to configure the system 212 to have the same data storage system identifier as 210 may be referred to as a spoofing configuration task causing the system 212 to operate in a spoofing mode with respect to device 214b thereby impersonating system 210 and device 214a (LUN X). In accordance with the foregoing, the target data storage system 212 is also configured to operate in a pass through mode with respect to commands received from the host 202 directed to the target device 214b (spoofed as device 214a). In this pass through mode, the target system 212 receives commands identifying the target device 214b and the target system 212 is configured to forward such commands to the system 210 for processing. The system 210 processes and services each of the commands received from system 212, determines a response to the command, and forwards the response to the system 212. The system 212 forwards the response to the host 202. Additionally, the system 212 performs processing to cache commands and associated responses directed to the target device 214b for those commands which are not user data commands. Thus, the target system 212 operates in a mode which monitors the command traffic received and directed to the device 214b (presented as device 214a to the host) to determine which commands are not user-data commands and then selectively caches those non-user data commands and associated responses (as determined by system 210). The system 212 may perform such a determination, for example, by examining command information such as the opcode which indicates if the command operation is for an I/O operation with respect to user data (e.g., to read or write user data to LUN X). If a received command for device 214b is not one of the recognized user-data commands, the system 212 may determine that the command is a non-user data command for the source system 210. In connection with this pass through mode for commands directed to device 214b and while the host 202 is able to access device 214a over path 204a, the system 212 may not perform other processing to service the command beyond forwarding the command to the system 210 and then forwarding the response to the command determined by the system 210 to the requesting host 202. When in pass through mode for the device 214b and while the host 202 is able to access device 214a over path 204a, the system 212 redirects commands for device 214b to the system 210 for servicing and then records command and associated response information (as determined and returned by the system 210) for received commands which are directed to device 214b and which are also not user-data commands. The foregoing recorded command and associated response information may be stored in cache 214 of the system 212.

An embodiment may operate the system in the example 200 with the target system in pass through mode for device 214b for a time period, such as a number of days. The time period may be characterized as a reasonable time period during which the target system 212 is able to capture a set of non-user data command and associated response information typical of what is issued by host 202 to the source device 214a. It should be noted that when in pass through mode for device 214b while the host is still able to access source device 214a and issue commands thereto over 204a, the target system may not store user data of source device 214a such as may be returned by the source system 210 when servicing an I/O command from the host as forwarded by the target system 212.

Figure 6:
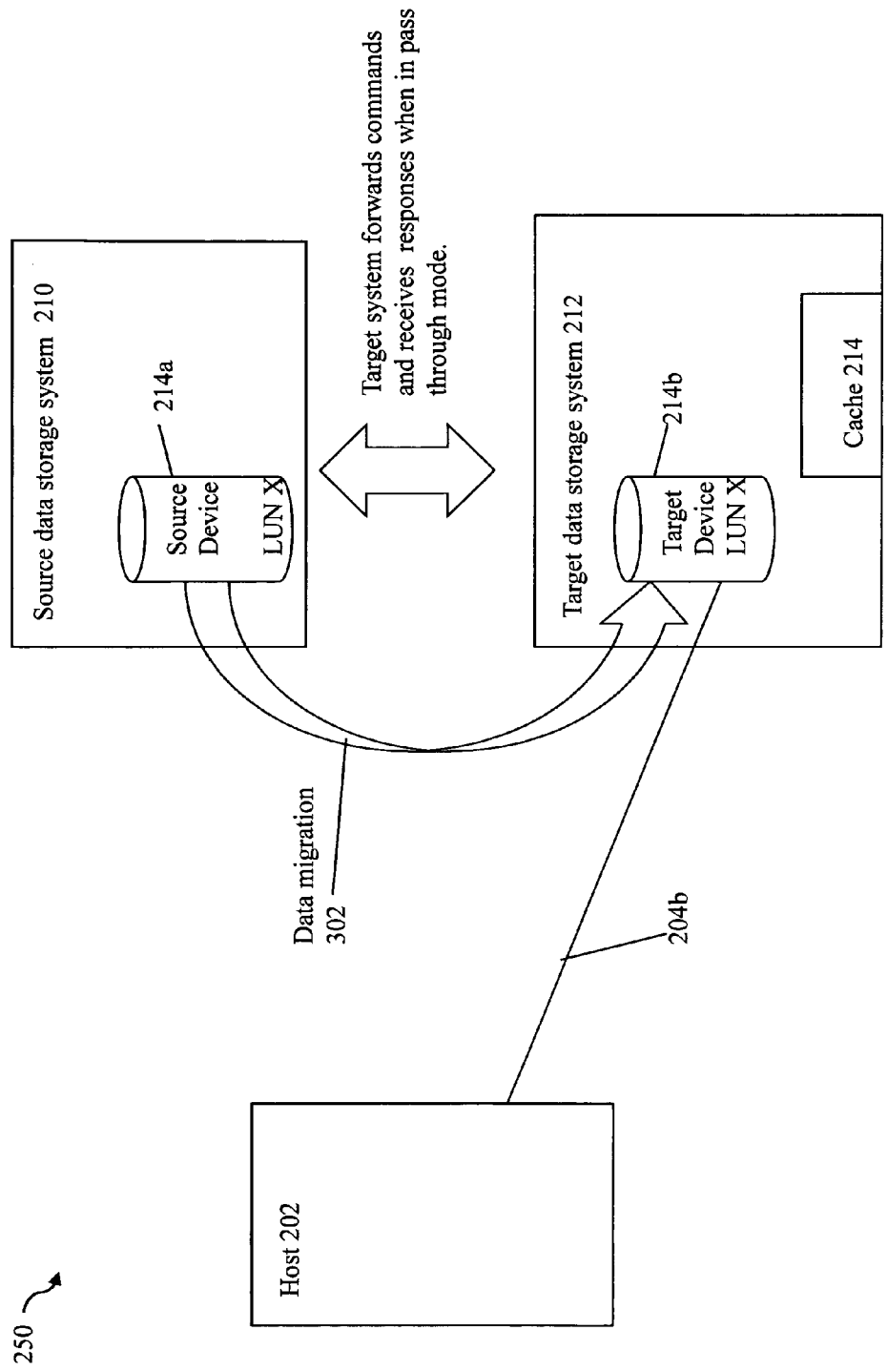

With reference now to the example 250 of FIG. 6, during the foregoing time period while the target system operates in pass through mode, source device 214a may be made unavailable to the host 202 (e.g., such as by the host being disconnected from the source system 210, or otherwise, thereby removing path 204a) and the data migration process 302 of migrating data from the source device 214a to target device 214b may be commenced. Such data migration processing may be performed using a direct or other connection between 210 and 212. During the migration process and after the host 202 has been disconnected from the system 210, the host is only connected to the target system 212 which the host perceives (through the spoofing mode and associated processing described above) is the system 210 and the host also perceives that the target device 214b is the source device 214a. Thus, from the perspective of host 202, the host 202 recognizes that it can access the source device 214a on a single path 204b at this point in time and can no longer access 214a over path 204a. While the migration process is ongoing and after the host 202 has been disconnected from the system 210, the host 202 may continue to issue commands to the impersonated or spoofed source device 214a by sending such commands to the target system 212 presented to the host as the source system 212. In connection with processing such commands at this time, the system 212 is still in pass through mode but now the migration process has commenced and the host is not able to access source device 214a over the path 204a. When processing these commands received at system 212 during the migration process, the target system may service a user-data command to read data from LUN X or the source device 214a, if possible, using data that has been migrated to the target device. Otherwise, if the requested read data has not yet been migrated from the source to the target system, the target system may forward the command to the source system 210 for processing, receive the requested read data from the source system, store the requested read data on the target device 214b, and forward the requested read data to the host 202. Thus, the target system 212 effectively forces an on-demand migration of the requested read data in order to service the request. When processing these commands received at system 212 during the migration process, the target system may also service a user-data command to write data to LUN X or the source device 214a. In this case, the target system may provide for writing the write data to the target device 214b and also writing the data to the source device 214a. An embodiment may perform the additional processing to also update or write the write data to the source device 214a in order to keep the source device 214a and target device 214b synchronized. In this manner, the source device 214a may be used, for example, if problems are experienced with the migration, in the event of failure or unavailability of the target system 212 or device 214b, and the like. When processing these commands received at system 212 during the migration process, the target system may also facilitate servicing a command that is a non-user data command (e.g., such as a control or management command as described elsewhere herein). In this case, since the system 212 is still connected to the system 210 and is in pass through mode, the system 212 may forward the non-user data command, or more generally, a command to which system 212 cannot respond appropriately as the source system 210 (e.g., due to failure or inability to recognize a command opcode and/or command input parameter, or inability to determine information that is to be included in the response and which varies with type of data storage system. The response may include information customized for the particular type of source system 210). If the system 212 is unable to appropriately process the received command (without using any information in cache 214), the system 212 may perform processing as described above where the command is forwarded to the source system 210 for processing, the system 210 determines and sends a response to the command to the system 212, the system 212 caches the command and associated response, and the system 212 forwards the response to the host 202.

Figure 7:
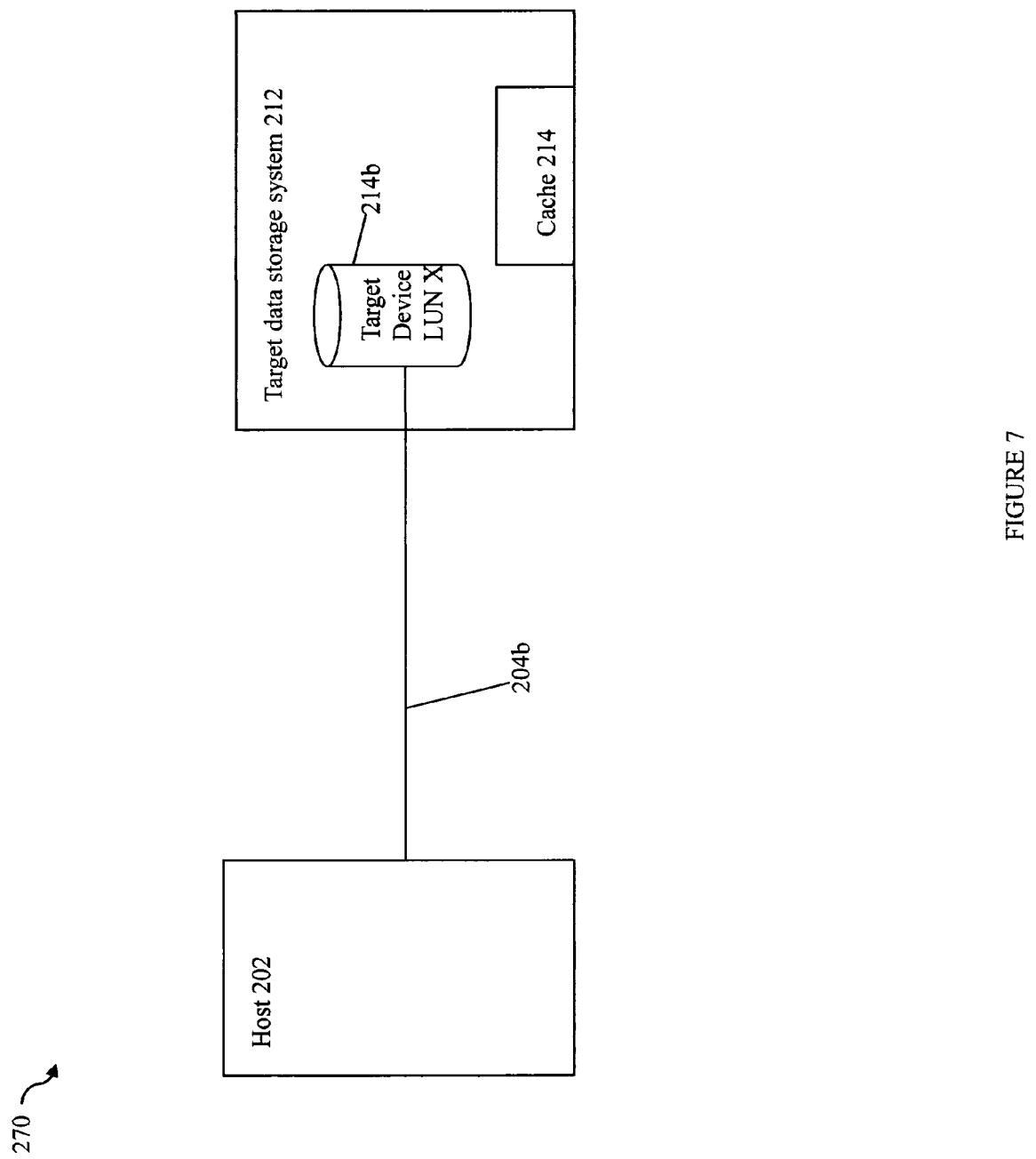

At some point after the data migration 302 has completed so that all data of the source device 214a has been copied to target device 214b, the source system 210 may be disconnected from the target system 212 resulting in a system as illustrated in the example 270 of FIG. 7. At this point as illustrated in FIG. 7, the target system 212 no longer has the ability to forward a non-user data command to the system 210 for processing. The target system 212 now transitions to operate in an echo mode with respect to commands for the target device 214b which is still presented and identified to the host 202 as the source device 214a. Furthermore, the target system 212 is still presented and identified to host 202 as the source system 210. Thus, the host 202 may still issue commands to system 212 expecting processing and results as if performed by the source system 210. When in echo mode, the target system 212 is able to service user data commands directed to the target device 214b (presented through spoofing as device 214a) using the migrated data of 214b. For servicing other commands, the target system 212 uses the recorded command/response information of the cache 214 as stored previously while in pass through mode. In other words, the system 212 may perform processing to determine whether a received command is a recognized user data command and may service this using data from 214b. Otherwise, the system 212 searches the previously cached command-response data to determine whether the received command matches a cached command. System 212 may perform a search by comparing the received command information to cached command information to determine whether any cached command information matches that of the received command information. The data items or fields of a command which are compared may include those fields comprising, for example, a command opcode and command input parameters. If no match in the cached data is found for a received command when the target system 212 operates in echo mode, an error or other appropriate status condition may be determined and an appropriate response accordingly returned to the host.

Thus, use of the cached command/response information allows the target system and target device presented to the host, respectively, as the source system and source device, to return expected responses for non-user data commands of the source system by returning previously recorded response data as determined by the source system. In this manner, the host may continue to operate as before the migration by continuing to issue commands to the target system as the spoofed source system.

Figure 8:
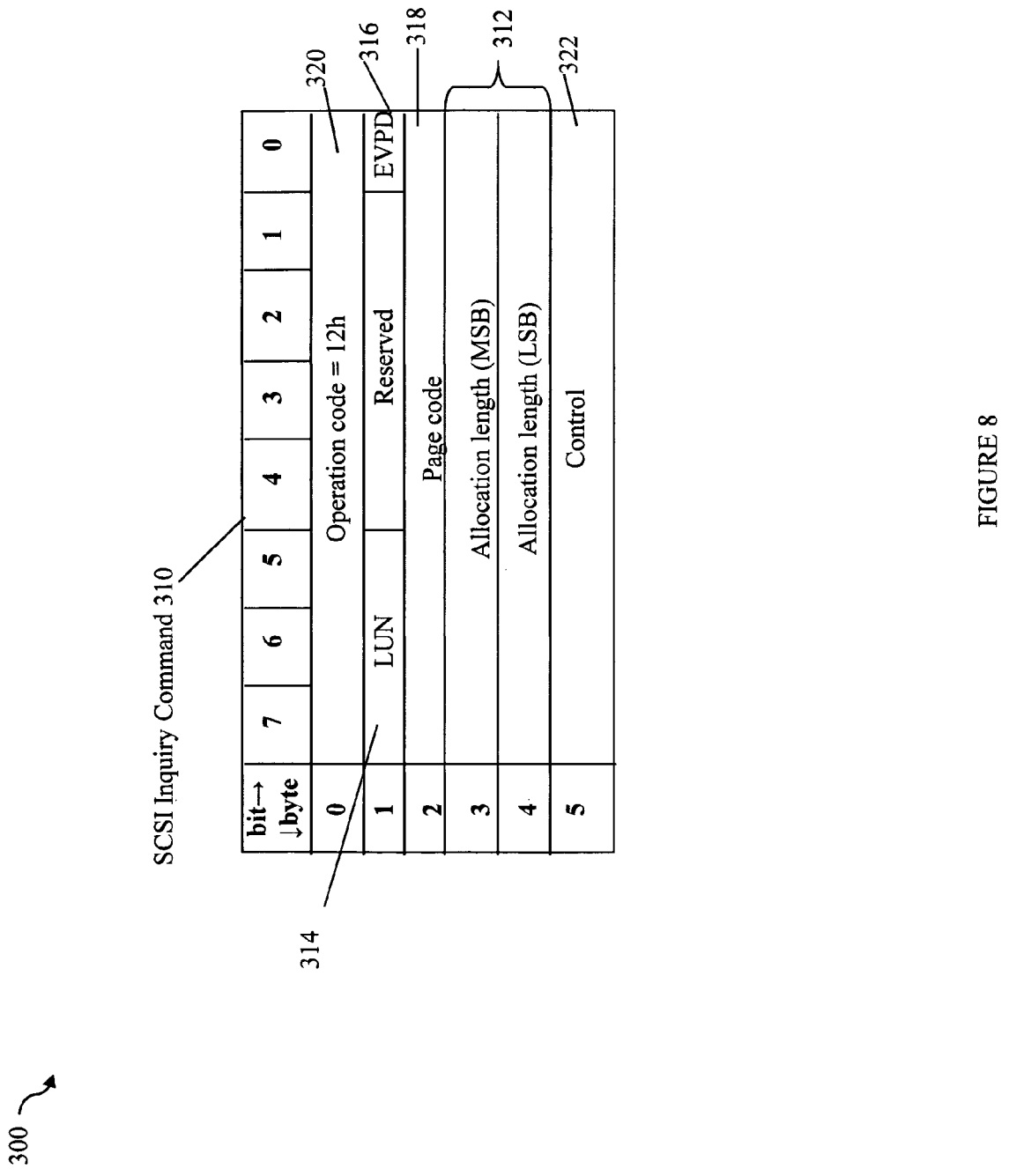
FIGS. 8 and 9 are examples of messages that may be transmitted in an embodiment in connection with techniques herein.

An example of a command that may be sent by the host to the source and/or target data storage system is a SCSI inquiry command as illustrated in FIG. 8 (FIG. 8 is described in more detail below). The SCSI inquiry command may be characterized as a command that is a non-user data command and, in particular, is a control and management command. While the target data storage system operates in pass through mode, the target data storage system (presented to the host as the spoofed source data storage system) may receive a SCSI inquiry command from the host where the command is directed to the target device (presented to the host as the spoofed source device). The target system may perform processing as described above to forward the inquiry command to the source system for processing, cache the SCSI inquiry command and associated response data (illustrated in FIG. 9 described in more detail below) as determined by the source data storage system, and return the associated response data to the requesting host. If the target system then receives the same SCSI inquiry command when operating in echo mode, the target system uses the cached information to return the expected response retrieved from cache thereby echoing or mirroring the response previously received by the host (i.e., when the target system was in pass through mode and the response was determined by the source system).

Referring to FIG. 8, shown is an example 300 of a command data block or payload of a SCSI command as may be used in an embodiment in accordance with techniques herein. The SCSI inquiry command 310 may be one exemplary command received at the source and/or target data storage systems. The SCSI inquiry command 310 include data in accordance with the illustrated format. The command 310 may specify the following fields: operation code 320 (e.g. indicating the inquiry command code), a LUN 314, EVPD (e.g., vital product data) indicator 316, page code 318, allocation length 312, and control 322. The format of 310 is in accordance with the SCSI standard. The standard page 0 inquiry command as described herein has the page code field 318 set to 0 and the EVPD field 316=0. A standard page 0 inquiry command may be sent as part of the sequence of instructions mentioned above for path recognition. The allocation length fields 312 specify an upper bound or maximum size of the response payload that may be returned by the data storage system as described in more detail below. In connection with 312, MSB denotes the most significant byte of the allocation length and LSB denotes the least significant byte of the allocation length. The EVPD field 316 in combination with the page code field 318 identify the type and amount of information that is returned in the response. Additionally, certain portions of the format are indicated as reserved in accordance with the SCSI standard. As will be appreciated by those skilled in the art, suitable data for the other fields may be specified even though not discussed in detail herein.

When in pass through mode, the target system may receive a SCSI inquiry command directed to the target device presented to the host as the source device. The command information for the SCSI inquiry command that is cached may include all fields in FIG. 8 except those indicated as reserved. Field 320 may include the command opcode, and fields 312, 314, 316, 318 and 322 may comprise the command inputs or parameters as described elsewhere herein.

Figure 9:
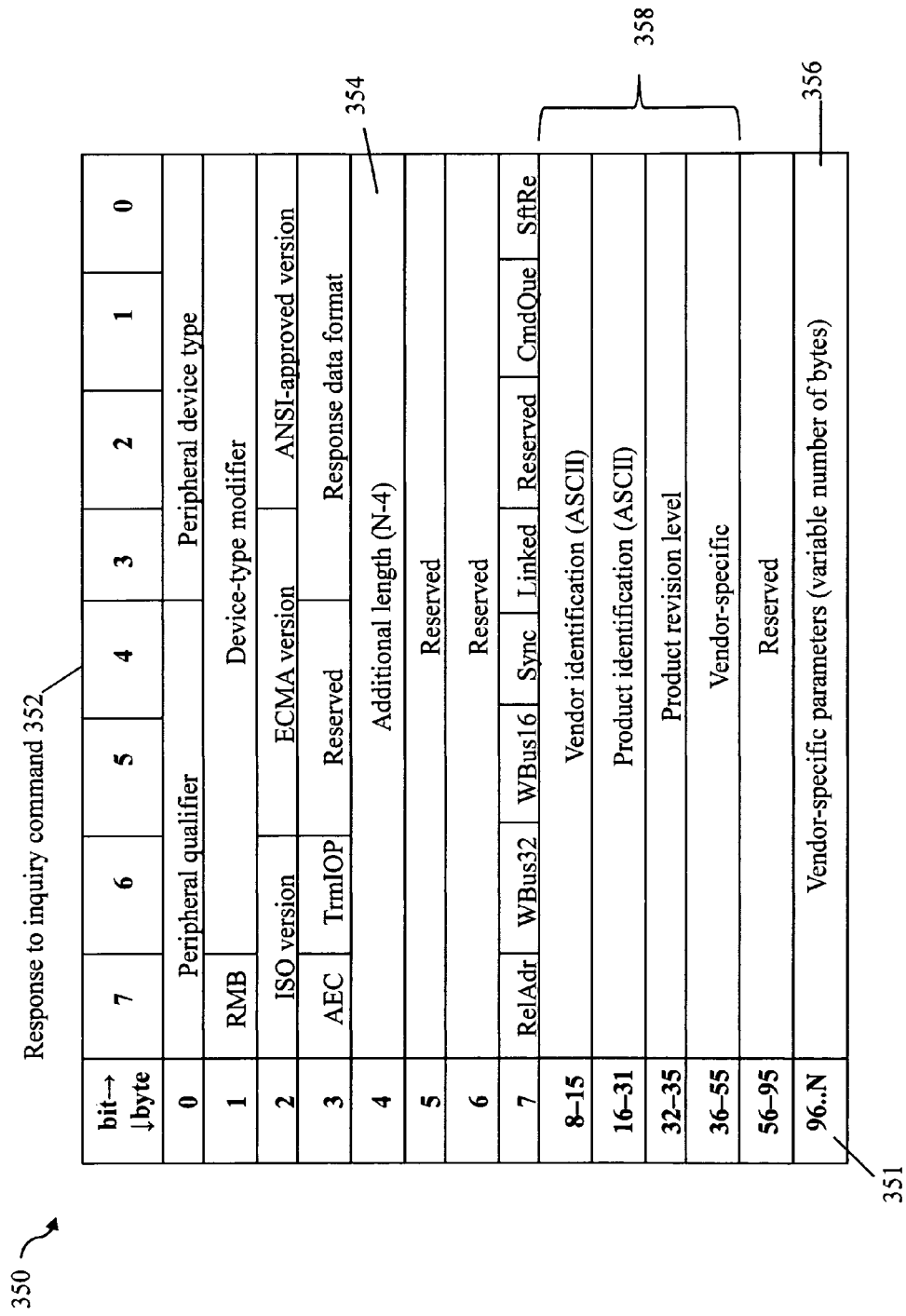

Referring to FIG. 9, shown is an example of a data format of a response to the inquiry command as may be used in an embodiment in accordance with techniques herein. The example 350 illustrates a format in accordance with the SCSI standard for the payload portion of a response message. A message in accordance with format 352 may be returned to the host from the target or source data storage systems. As represented by the variable byte offset field indicators 351, the size of the response payload to the inquiry command may vary depending on the length of the vendor specific parameters field 356. Element 351 denotes the field 356 as having a last byte located at any offset from 96 to N (e.g., field 356 may be 1 or more bytes). As described above in connection with FIG. 8, the corresponding inquiry command may specify an allocation length 312 indicating a maximum size of the payload of the response (e.g., the maximum size of the data returned having format 352). The response 352 may include the additional length field 354 that specifies the actual length in bytes of the parameters or following data. Thus, field 354 indicates the actual size of the response payload following field 354. The value indicated by field 354+4 bytes should not exceed the maximum size specified by the allocation length 312 of FIG. 8 in an embodiment denoting byte locations or offsets which are zero-based.

When in pass through mode, the target system may also cache response data associated with a SCSI inquiry command having a layout or format as illustrated in FIG. 8. The response information that is cached and associated with the received SCSI inquiry command described above may include all fields except those indicated as reserved in FIG. 9. It should be noted that the inquiry response of FIG. 9 includes information that may be characterized as vendor-specific or customized as may vary with data storage system type. Fields 356 and 358 are examples of such fields.

With reference to FIGS. 3-7, transmissions in accordance with FIGS. 8 and 9 may be sent between the hosts and data storage systems while the target data storage system operates in pass through mode and/or echo mode. After operating the target system for the target device in echo mode for a period of time, configuration processing may be performed to reconfigure the target system to disable the spoofing of the source system and source device. As part of this reconfiguration, the target data storage system is reconfigured to have an updated data storage system identifier so that the target system no longer has the source data storage system identifier. In a similar manner, the target device may be reconfigured to have an updated device identifier so that the target device no longer has the source device identifier. It should be noted that the target device may still be associated with the same LUN X as the source device but the target device's device identifier uniquely distinguishing between different LUN instances is now updated. The host may be rebooted and perform discovery processing. As a result of commands issued from the host to the target system for this rediscovery, the target system returns information identifying the target system by the updated data storage system identifier, and identifying the target device by the updated device identifier. Additionally, after such reconfiguration to disable spoofing, in response to non-user data commands such as the SCSI inquiry command described herein, the target data storage system may return information based on the storage system vendor, type information, vendor-specific or vendor customized information, and the like, for the target system rather than the source system. In other words, when operating in echo mode as described above, the target system mirrors behavior of the source system. Now, after the foregoing reconfiguration, the target system operates in a normal mode and no longer spoofs the source system and source device. In this normal mode, the target system may process commands based on its own identity (e.g. based on the type, vendor, and other characteristics and attributes of the target data storage system) and return appropriate responses for the actual type and other aspects of the target system. When operating in normal mode, the cached command/response data is no longer used and may therefore be removed from the cache.

Using the foregoing techniques, data of multiple devices may be migrated from source to target data storage systems in phases or portions. For example, a first set of one or more LUNs may have their data migrated at a first point in time different than a second set of one or more LUNs. Additionally, once such data has been migrated to the target systems, the host may selectively recognize individual LUNs as being either included in the source data storage system (e.g. where the target data storage system operates in spoofed mode for the LUNs) or in the target system (e.g., where the target system no longer runs in spoofing mode and where target system and LUNs are now presented to the host, respectively, as the target system and LUNs in the target system rather than the source system). Since the techniques herein may be performed in connection with migrating data on a per LUN basis, it will be appreciated by those of ordinary skill in the art that the appropriate state information may be maintained to provide such functionality on a per LUN basis.

It should be noted that there may be some non-user data commands of the source system which require additional processing other than returning particular information in a response in order to mirror or echo behavior of executing such commands. Such additional processing may include, for example, reconfiguring elements of the source system, modifying attributes or values of metadata such as of the source device, and the like. Such additional processing may not be performed in an embodiment in accordance with techniques herein. Furthermore, it may be the case that a particular non-user data command is received at the target system when operating in echo mode which was not previously received when the target system was operating in pass through mode. In this case, the target system operating in echo mode does not have any recorded cached command/response information, is therefore unable to send a response to the host as if from the source system and thus results in an error or other appropriate status condition.

Figure 10:
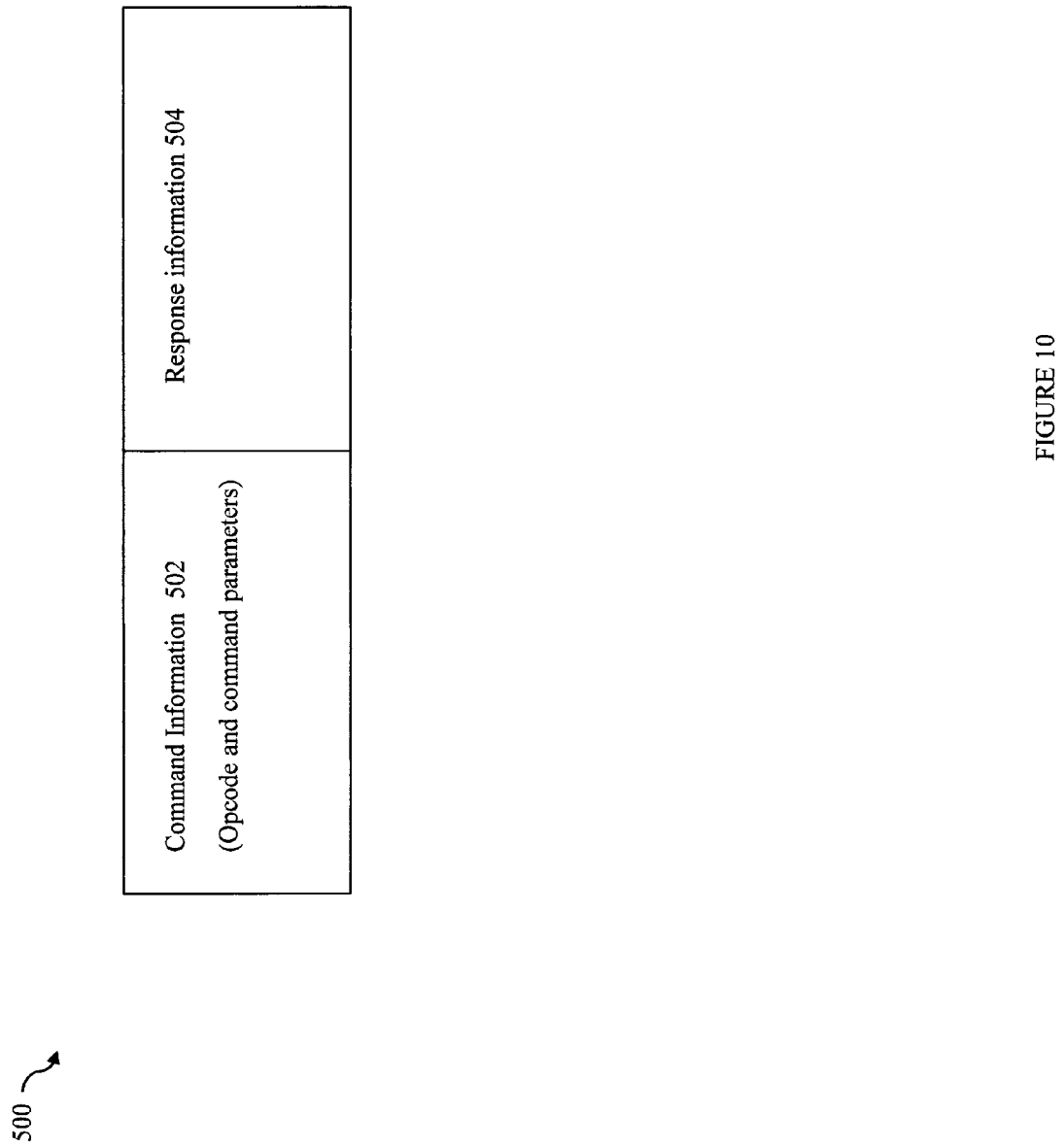
FIG. 10 is an example of command and response information cached on a target system as may be used in an embodiment accordance with techniques herein.

Referring to FIG. 10, shown is an example of information that may be stored in the cache of the target system in an embodiment in accordance with techniques herein. The example 500 includes command information 502 and associated response information 504 for observed non-user data commands when operating the target system in pass-through mode. The command information 502 may include, for example, a command opcode and any command parameters. The response information 504 may be that information included in the response determined by the source system and stored at the target system in response to a received command from the host when the target system operates in accordance with spoofing mode to spoof the source system and source device. As described above, the information in the example 500 of FIG. 10 may be recorded by the target system when in operating in pass through mode and then used in responding to commands when operating in echo mode.

Figure 11:
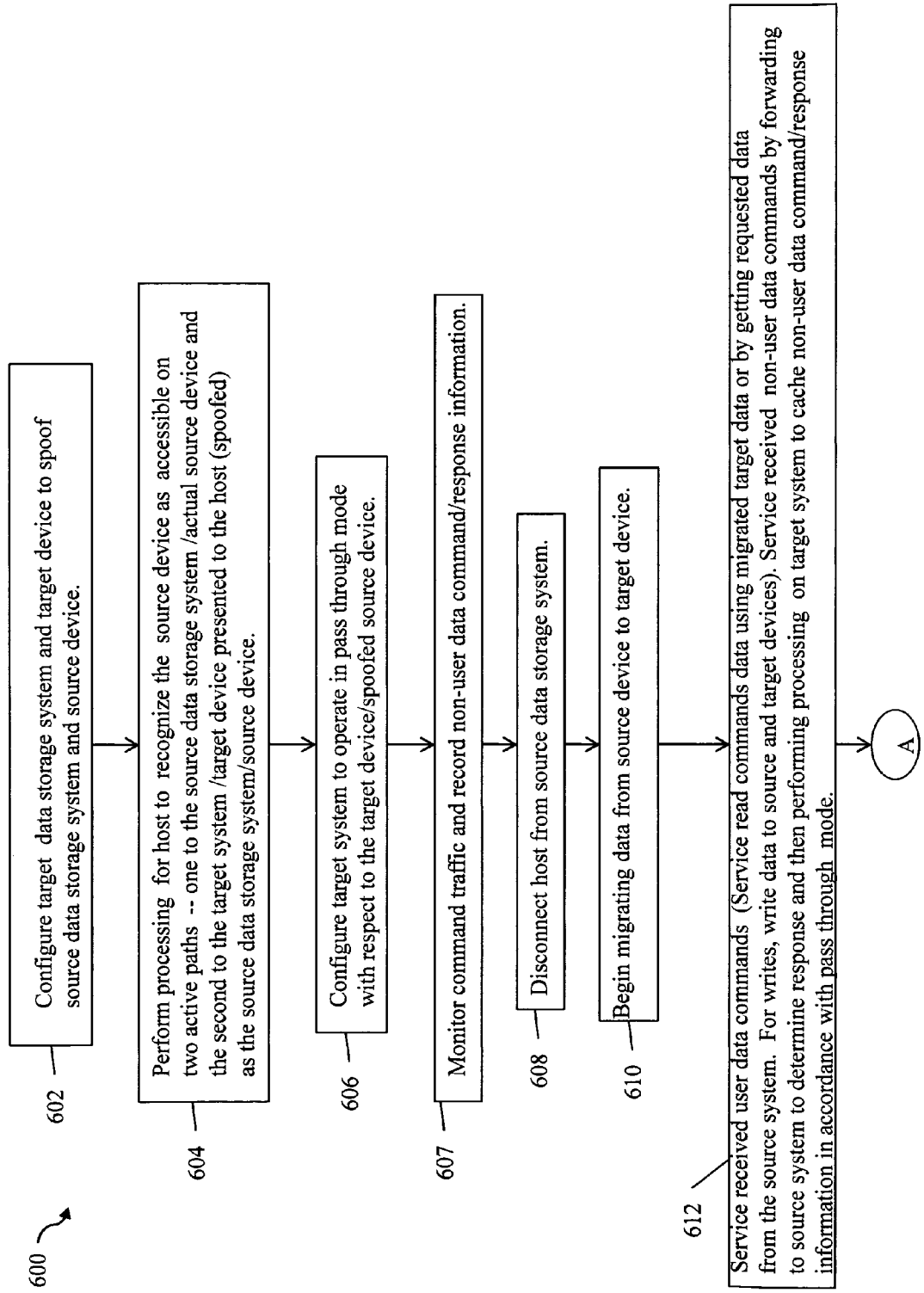
FIGS. 11 and 12 include processing steps that may be performed in an embodiment in accordance with techniques herein.
Figure 12:
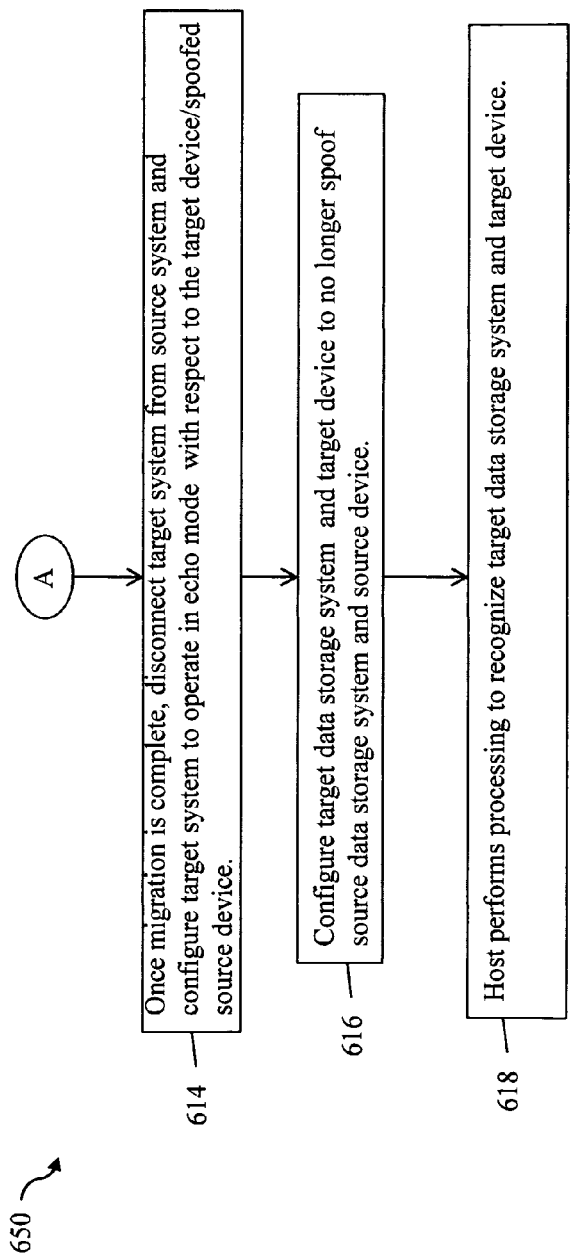

Referring to FIGS. 11 and 12, shown are flowcharts 600 and 650 of processing steps that may be performed in an embodiment in accordance with techniques herein. The flowcharts summarize processing described above. At step 602, the target data storage system and target device are configured to be in a spoofing mode to spoof, respectively, the source data storage system and source device. At step 604, processing is performed for the host to recognize the source device as being accessible on two active paths—one path from the host to the source system/actual source device and a second path from the host to the target system/target device presented to the host (spoofed) as the source system/device. At step 606, the target system is configured to operate in pass through mode with respect to the target device as the spoofed source device. At step 607, the target data storage system monitors received command traffic for the target device and records non-user data command and response information. Step 607 also includes the target system performing other processing in connection with forwarding appropriate commands to the source system for processing to obtain the associated response and forwarding the response to the host. At step 608, the host is disconnected from the source data storage system. In response to this disconnect in step 608, the host continues to issue commands directed to the source device. However, the host now only recognizes a single path to the source device—the path to the target system/target device spoofing the source system/source device. At step 610, the data migration process for migrating data from the source device to the target device is commenced. At step 612, while the migration is ongoing, the host may issue commands received at the target system and directed to the target device as the spoofed source device. Such commands which are user data commands to read user data may be serviced by the target system using migrated data f the target device or by getting the requested data from the source device if the requested data has not yet been migrated. Such commands which, are user data commands to write user data may be serviced by writing data to the source and target devices. Commands received which are non-user data commands are forwarded to the source system for determine the appropriate response and send the response from the source system to the target system. Processing may then be performed on the target system to cache the non-user data command/response information in accordance with pass through mode. At step 614, once migration is completed, the target system may be disconnected from the source system. The target system may be configured to operate in echo mode with respect to the target device as the spoofed source device. At step 616, the target system and target device are configured to operate in a normal mode and no longer spoof, respectively, the source system and source device. At step 618, the host may perform processing, such as in connection with rebooting the host and performing discovery processing, to recognize the target data storage system and target device in accordance with their reconfigured actual identities as performed in step 616. Commands subsequently received at the target system from the host after performing processing of FIGS. 11 and 12 may result in the target system providing responses based on the actual or native understanding, capabilities, and aspects of the target system. As such, for example, the target system provides responses customized for the type, vendor, and the like, of the target data storage system, and recognizes and executes commands based on the command information understood by the target system rather than the source system.

It should be noted that the techniques herein may be applied to various embodiments such as, for example, where the source and target systems are different heterogeneous data storage systems. Furthermore, although the techniques herein have particular applicability and usefulness in connection with heterogeneous source and target systems, the techniques herein may also be used in an embodiment in which the source and target data storage systems are also homogeneous. Still further, although the source and target systems may be different physical storage systems, such as two different storage arrays, the techniques herein may also be performed in an embodiment in which the source and target data storage systems are the same data storage system. In other words, the techniques herein may be used for seamless migration of data from a source to a target device where both such devices are physically located in the same as well as different data storage systems.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of migrating data from a source device of a source data storage system to a target device of a target data storage system comprising:

configuring the target data storage system to operate in accordance with a spoofing mode and a pass-through mode for the target device, wherein the spoofing mode causes the target data storage system to represent the target device to a host as the source device of the source data storage system, wherein the source device is accessible to the host on a first path between the host and the source data storage system and the target device is accessible to the host on a second path between the host and the target data storage system and wherein the host identifies the first path and the second path as alternate paths to the source device;

processing a first set of commands from the host which are not user-data commands and which are received at the target data storage system for the target device when in the pass-through mode and the spoofing mode with respect to the target device, wherein processing each command of the first set of commands includes forwarding said each command of the first set to the source data storage system for processing and storing said each command of the first set and associated response as determined by the source data storage system in a cache at the target data storage system, and returning the associated response to the host, wherein when in the pass-through mode for the target device and prior to migrating data from the source device to the target device, first processing is performed for user-data commands, said first processing including:

forwarding, from the target data storage system to the source data storage system for processing, all user-data commands directed to the target device represented as the source device; and returning, from the source data storage system to the target data storage system, user data in connection with servicing the user-data commands forwarded, and wherein the target data storage system does not store the user data, that is returned from the source data storage system to the target data storage system in said returning, for use in servicing subsequent user data commands;

migrating data from the source device to the target device;

configuring the target data storage system to operate in an echo mode for the target device after the migration of data from the source device to the target device is completed; and processing a second set of commands from the host received at the target data storage system when in the spoofing mode and when in the echo mode for the target device, wherein the second set of commands are not user-data commands and are directed to the target device represented to the host as the source device, wherein processing each of the second set of commands includes the target data storage system using information stored in the cache from processing the first set of commands for responding to said each of the second set of commands.

2. The method of claim 1, wherein the source data storage system is heterogeneous with respect to the target data storage system.

3. The method of claim 2, wherein when the target data storage system is in the spoofing mode so that the target device is presented as the source device, the target device is identified to the host as having a same device identifier of the source device and the target data storage system is identified to the host as having a same data storage system identifier as the source data storage system.

4. The method of claim 2, wherein at least a portion of the first set of commands is processed during the migration, and the method further includes:

determining whether said each command of the portion is a user data command to read user data that can be serviced by the target data storage system; and if said each command is a user data command to read user data that cannot be serviced by the target data storage system, forwarding said each command to the source data storage system, returning requested read data from the source data storage system to the target data storage system, storing the requested read data on the target device, and returning the requested read data in a response to said each command to the host.

5. The method of claim 2, wherein at least a portion of the first set of commands is processed during the migration, and the method further includes:

determining whether said each command of the portion is a user data command to write user data; and if said each command is a user data command to write user data, writing the user data to the target device, forwarding said each command to the source data storage system to write the user data to the source device, and returning a response to the host for said each command indicating that the user data is written.

6. The method of claim 2 wherein, when the target data storage system is operating in the echo mode and processing the second set of commands, the source data storage system is disconnected from the host and target data storage system thereby making, respectively, the source device inaccessible to the host and inaccessible to the target data storage system.

7. The method of claim 2, wherein, when the target data storage system is operating in the echo mode for the target device represented to the host as the source device and processing the second set of commands, the target data storage system responds to all commands from the host directed to the target device without communicating with the source data storage system.

8. The method of claim 2, wherein the first data storage system is a first type of data storage system and the second data storage system is a second type different from the first type.

9. The method of claim 8, wherein the first data storage system and the second data storage system are provided by different data storage system vendors.

10. The method of claim 3, further comprising:

configuring the target data storage system for the target device to a normal mode of operation for processing commands directed to the target device wherein, in response to being configured to operate in the normal mode for the target device, the spoofing mode for the target device is disabled so that the target device is represented to the host as the target device of the target data storage system, the target data storage system is presented to the host as the target data storage system rather than the source data storage system, and the echo mode is disabled.

11. The method of claim 10, further comprising:

rebooting the host; and performing discovery processing by the host, wherein, as a result of the discovery processing, the target device is presented to the host as the target device from the target data storage system, the target device being identified to the host as having a new device identifier different than the identifier of the source device and the target data storage system being identified to the host as having a new data storage system identifier different than the data storage system identifier of the source data storage system.

12. The method of claim 11, wherein after performing said discovery processing, subsequent commands from the host received at the target data storage system for the target device are processed as commands directed to the target device of the target data storage system.

13. The method of claim 9, wherein the source data storage system is able to interpret and execute a first vendor-unique command of a first vendor and the target data storage system is unable to interpret and execute the first vendor-unique command.

14. The method of claim 13, wherein, at a first point in time, the target data storage system is configured to operate in the pass-through mode for the target device and performs processing including:
receiving a first command from the host that includes a first input that is any of the first vendor-unique command, a command input parameter recognized by the source data storage system but not the target data storage system, and a command opcode recognized by both the source and the target data storage systems wherein an expected response for the command opcode includes at least one data item that varies with data storage system vendor or data storage system type; and
recording first information of a response to the first command determined by the source data storage system.

15. The method of claim 14, wherein at a second point in time subsequent to the first point in time the target data storage system is configured to operate in the echo mode for the target device, thereby sending responses as if from the source device of the source data storage system, and performs processing including:
receiving a second command from the host that includes the first input; and
sending a response to the second command from the host including the first information previously recorded.

16. The method of claim 15, wherein at a third point in time subsequent to the second point in time the target data storage system is configured to operate in a normal mode for the target device resulting in disabling the echo mode for the target device and disabling the spoofing mode for the target device so that the target device is represented to the host as the target device of the target data storage system rather than the source device of the source data storage system, wherein commands directed to the target device when operating in the normal mode for the target device result in determining appropriate responses in accordance with the target device and target data storage system.

17. A non-transitory computer readable medium comprising code stored thereon for migrating data from a source device of a source data storage system to a target device of a target data storage system, the non-transitory computer readable medium comprising code for:
configuring the target data storage system to operate in accordance with a spoofing mode and a pass-through mode for the target device, wherein the spoofing mode causes the target data storage system to represent the target device to a host as the source device of the source data storage system, wherein the source device is accessible to the host on a first path between the host and the source data storage system and the target device is accessible to the host on a second path between the host and the target data storage system and wherein the host identifies the first path and the second path as alternate paths to the source device;
processing a first set of commands from the host which are not user-data commands and which are received at the target data storage system for the target device when in the pass-through mode and the spoofing mode with respect to the target device, wherein processing each command of the first set of commands includes forwarding said each command of the first set to the source data storage system for processing and storing said each command of the first set and associated response as determined by the source data storage system in a cache at the target data storage system, and returning the associated response to the host, wherein when in the pass-through mode for the target device and prior to migrating data from the source device to the target device, first processing is performed for user-data commands, said first processing including:
forwarding, from the target data storage system to the source data storage system for processing, all user-data commands directed to the target device represented as the source device; and
returning, from the source data storage system to the target data storage system, user data in connection with servicing the user-data commands forwarded, and wherein the target data storage system does not store the user data, that is returned from the source data storage system to the target data storage system in said returning, for use in servicing subsequent user data commands;
migrating data from the source device to the target device;
configuring the target data storage system to operate in an echo mode for the target device after the migration of data from the source device to the target device is completed; and
processing a second set of commands from the host received at the target data storage system when in the spoofing mode and when in the echo mode for the target device, wherein the second set of commands are not user-data commands and are directed to the target device represented to the host as the source device, wherein processing each of the second set of commands includes the target data storage system using information stored in the cache from processing the first set of commands for responding to said each of the second set of commands.

18. The non-transitory computer readable medium of claim 17, wherein the source data storage system is heterogeneous with respect to the target data storage system, and when the target data storage system is in the spoofing mode so that the target device is presented as the source device, the target device is identified to the host as having a same device identifier of the source device and the target data storage system is identified to the host as having a same data storage system identifier as the source data storage system.

19. The non-transitory computer readable medium of claim 17, wherein the source data storage system is heterogeneous with respect to the target data storage system and wherein at least a portion of the first set of commands is processed during the migration, and the non-transitory computer readable medium further includes code for:

determining whether said each command of the portion is a user data command to read user data that can be serviced by the target data storage system; and if said each command is a user data command to read user data that cannot be serviced by the target data storage system, forwarding said each command to the source data storage system, returning requested read data from the source data storage system to the target data storage system, storing the requested read data on the target device, and returning the requested read data in a response said each command to the host.

20. The non-transitory computer readable medium of claim 17, wherein the source data storage system is heterogeneous with respect to the target data storage system and wherein at least a portion of the first set of commands is processed during the migration, and the non-transitory computer readable medium further includes code for:

determining whether said each command of the portion is a user data command to write user data; and if said each command is a user data command to write user data, writing the user data to the target device, forwarding said each command to the source data storage system to write the user data to the source device, and returning a response to the host for said each command indicating that the user data is written, and wherein when the target data storage system is operating in the echo mode and processing the second set of commands, the source data storage system is disconnected from the host and target data storage system thereby making, respectively, the source device inaccessible to the host and inaccessible to the target data storage system.

* * * * *